United States Patent
Al-Saggaf

(10) Patent No.: US 12,463,969 B2
(45) Date of Patent: Nov. 4, 2025

(54) SYSTEM AND METHOD OF QUANTUM-RESISTANT PASSWORDLESS AUTHENTICATION

(71) Applicant: KING FAHD UNIVERSITY OF PETROLEUM AND MINERALS, Dhahran (SA)

(72) Inventor: Alawi Abdulrahman Hassan Al-Saggaf, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 210 days.

(21) Appl. No.: 18/454,480

(22) Filed: Aug. 23, 2023

(65) Prior Publication Data

US 2025/0071112 A1    Feb. 27, 2025

(51) Int. Cl.
*H04L 9/40*      (2022.01)
*G06F 17/16*     (2006.01)

(52) U.S. Cl.
CPC .......... *H04L 63/0884* (2013.01); *G06F 17/16* (2013.01); *H04L 63/0838* (2013.01); *H04L 63/0861* (2013.01)

(58) Field of Classification Search
CPC ............. H04L 63/0884; H04L 63/0838; H04L 63/0861; G06F 17/16
See application file for complete search history.

(56) References Cited

U.S. PATENT DOCUMENTS 11,483,310 B1   10/2022   Al-Saggaf
2015/0304320 A1*   10/2015   Jo .......................... G06V 40/10
                                                  713/171

FOREIGN PATENT DOCUMENTS

CN         102750529 A     10/2012

OTHER PUBLICATIONS

Al-Saggaf; A Post-Quantum Fuzzy Commitment Scheme for Biometric Template Protection: An Experimental Study; IEEE Access, vol. 9; Jul. 28, 2021; 10 Pages.
Arjona et al.; Post-Quantum Biometric Authentication Based on Homomorphic Encryption and Classic McEliece; Applied Sciences, 13; Jan. 5, 2023; 19 Pages.
Arjona et al.; A Post-Quantum Biometric Template Protection Scheme Based on Learning Parity With Noise (LPN) Commitments; IEEE Access, vol. 8; Oct. 5, 2020; 11 Pages.

* cited by examiner

*Primary Examiner* — Matthew T Henning
(74) *Attorney, Agent, or Firm* — Oblon, McClelland, Maier & Neustadt, L.L.P.

(57) ABSTRACT

A system and method for passwordless authentication for accessing a remote system includes an authentication server, a database, and a user computing device. The user computing device is configured to send a request to the authentication server. The authentication server is configured to generate, a lattice matrix, store the lattice matrix in the database, and return a lattice generator matrix (LGM) to the user computing device. The user computing device is further configured to compute a bioquantum of biometric data of a user based on the LGM using a post-quantum fuzzy commitment scheme (PQFC) and send the bioquantum to the authentication server for storage in the database.

17 Claims, 12 Drawing Sheets

SYSTEM AND METHOD OF QUANTUM-RESISTANT PASSWORDLESS AUTHENTICATION

STATEMENT OF ACKNOWLEDGEMENT

King Fahd University of Petroleum & Minerals is gratefully acknowledged for providing facilities for this research under Project No. INSS2210.

BACKGROUND

Technical Field

The present disclosure is directed to a system and a method of quantum-resistant passwordless authentication.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Authentication is the process of confirming an identity of someone or something by providing proof of ownership. It can be used to protect systems and information from unauthorized access to ensure the integrity of data.

A step of logging into a remote system is increasing in complexity as counter tactics to gain unauthorized access to systems become more sophisticated. One current login process, known as two factor authentication, requires unlocking two devices, typically a smartphone and a laptop or desktop computer. Once these two devices are unlocked, a login process is needed to authenticate a user with a remote device. This login process involves at least two devices.

Hacking passwords has also become more sophisticated as computing devices increase in processing power. More recently, quantum computing has brought about an even greater potential for hacking passwords. In particular, Shor's algorithm, a quantum algorithm for integer factorization, can be adapted to break many popular encryption schemes used to protect passwords, including RSA and elliptic curve cryptography. In theory, a quantum computer with just a few hundred qubits could break most passwords in a matter of seconds.

Passwordless authentication is a convenient way to access accounts without the need to remember passwords, personal identification numbers (PINs), and other authentication means. Currently, there are several passwordless authentication techniques that may be employed. The fast identity online (FIDO) alliance are a group of passwordless authentication standards. The FIDO passwordless authentication technique uses public key cryptography to create a secure connection between a user and a server provider. According to the FIDO passwordless authentication technique, the user authenticates with a token, and the token generates public cryptographic key pair (public or private), where the private key is locked in the token using the user's biometric data. When the user wants to prove his or her identity, then the user unlocks the private key and signs a request or challenge. This signature is then sent to the service provider for verification.

Another passwordless authentication technique that has been implemented recently is MitID. The security of the MitID was studied and analyzed from the perspective of user experience. It was observed that simple automated scripts could prevent targeted users from authenticating for up to nine days, as well as collect information needed for identifying theft through social engineering and denial of service attacks.

Yet another passwordless authentication technique that has been implemented is METASECURE. This passwordless authentication technique provides three layers of security using device attestation, facial recognition and the use of physical security keys, security keys, or smartcards by FIDO2 specifications.

However, these passwordless authentication techniques suffer from various limitations. For example, if an attacker gains access to a user's biometric data, then the attacker can use the biometric data to access the user's private key. Also, these passwordless authentication techniques are no longer secure in the upcoming quantum computing era and have compatibility issues. Further, these passwordless authentication techniques are costly as they require specialized hardware and software.

Accordingly, there is a need for improved systems and methods that overcome above mentioned disadvantages.

SUMMARY

An aspect of the present disclosure is a method of passwordless authentication for a remote system by way of an authentication server is disclosed. The method includes a registration stage including sending a request to the authentication server to use the passwordless authentication. The method further includes generating, by the authentication server, a lattice matrix, storing the lattice matrix in a database, and returning a lattice generator matrix (LGM) to a user computing device. The method also includes computing, by the user computing device, a bioquantum of biometric data of a user based on the LGM using a post-quantum fuzzy commitment scheme (PQFC) and sending the bioquantum to the authentication server for storage in the database.

A further aspect of the present disclosure is a system for passwordless authentication for a remote system is disclosed. The system includes an authentication server, a database, and a user computing device. The user computing device is configured to send a request to the authentication server to use the passwordless authentication. The authentication server is configured to generate, a lattice matrix, store the lattice matrix in the database, and return a LGM to the user computing device. The user computing device is configured to compute a bioquantum of biometric data of a user based on the LGM using a PQFC and send the bioquantum to the authentication server for storage in the database.

A further aspect of the present disclosure is a non-transitory computer readable storage medium storing program code which when executed by processing circuitry performs a method of passwordless authentication for a remote system by way of an authentication server is disclosed. The method includes a registration stage including sending a request to the authentication server to use the passwordless authentication. The method further includes generating, by the authentication server, a lattice matrix, storing the lattice matrix in a database, and returning a LGM to a user computing device. The method includes computing, by the user computing device, a bioquantum of biometric data of the user based on the LGM using a PQFC and sending the bioquantum to the authentication server for storage in the database.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
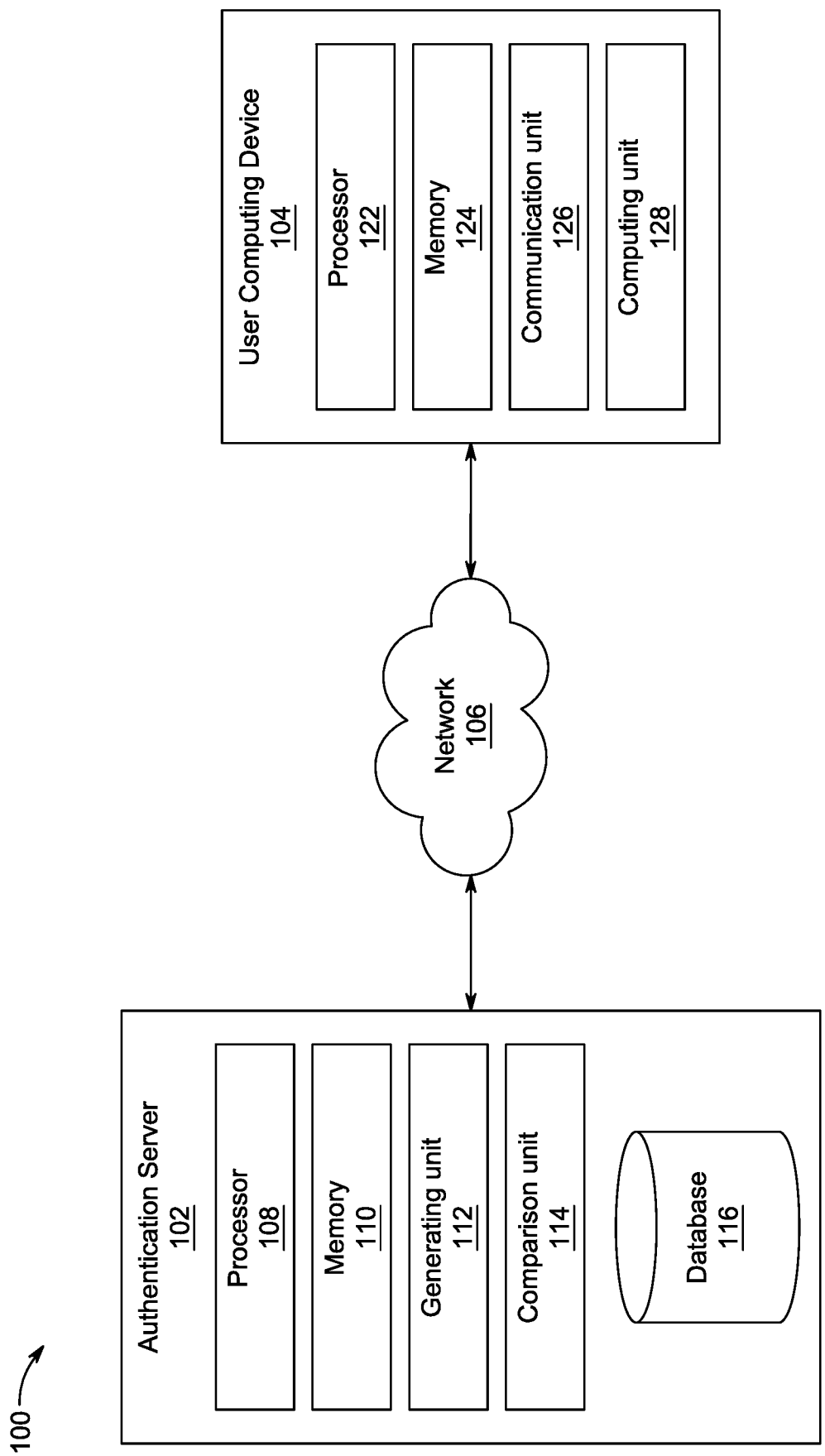
FIG. 1 depicts an implementation of an architecture of a system 100 for passwordless authentication, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of the present disclosure are directed to system and methods for quantum-resistant passwordless (Q-PASS-LESS) authentication (hereinafter referred to as passwordless authentication).

FIG. 1 depicts an implementation of an architecture of a system 100 for passwordless authentication, according to certain embodiments. In one embodiment, the password authentication is for accessing a remote system.

For purposes of this disclosure, a remote system may be any service or device that requires user authentication to access. Examples of remote services, include, but are not limited to, virtual environments, cloud services, Web sites such as bank or financial Web sites, Web sites in which users have an account, e.g., store Web sites, unilitiy Web sites, publication Web sites, to name a few. Examples of remote devices include, but are not limited to, devices in which remote services are running, remote controlled devices, and remote controlled security monitoring systems.

The system 100 may include an authentication server 102, a user computing device 104, and a network 106 enabling communication between the system components for information exchange. According to an implementation, the authentication server 102 may be deployed and/or executed on any type and form of computing device, for example, a computer, network device, or appliance capable of communicating on any type and form of network (such as the network) and perform the operations described herein. In some embodiments, the authentication server 102 may be implemented across a plurality of servers, thereby, tasks performed by the authentication server 102 may be performed by the plurality of servers. These tasks may be allocated among the cluster of servers by an application, a service, a daemon, a routine, or other executable logic for task allocation.

In some embodiments, the user computing device 104 may be any device used by a user. In an implementation, the user computing device 104 may be any computing device, such as, but not limited to, a mobile device, a smart phone, a tablet, a personal digital assistant, a laptop, or any other type and/or form of computing device that is capable of communication. In other embodiments, the computing device includes a memory and a processor coupled to the memory.

According to an embodiment, the network 106 may be a private network or a public network. Further, the network 106 may be connected via wired and/or wireless links. Wired links may include Digital Subscriber Line (DSL), coaxial cable lines, or optical fiber lines. Wireless links may include Bluetooth®, Wi-Fi®, Worldwide Interoperability for Microwave Access (WiMAX®), an infrared channel or a satellite band. The wireless links may also include any cellular network standards to communicate among mobile devices. The network standards may qualify as one or more generations of mobile telecommunication standards by fulfilling a specification or standards such as the specifications maintained by the International Telecommunication Union. Examples of cellular network standards include Advanced Mobile Phone System (AMPS), Global System for Mobile (GSM), General Packet Radio Services (GPRS), Universal Mobile Telecommunications Service (UMTS), and Code-Division Multiple Access (CDMA). Wireless standards may use various channel access methods, e.g., Frequency-Division Multiple Access (FDMA), Time Division Multiple Access (TDMA), Code-Division Multiple Access (CDMA), or Spatial Division Multiple Access (SDMA). In some embodiments, different types of data may be transmitted via different links and standards. In other embodiments, the same types of data may be transmitted via different links and standards.

Further, the network 106 may be any type and/or form of network. The geographical scope of the network may vary widely and the network 106 may be a local-area network (LAN), e.g., Intranet, a wide area network (WAN), or the Internet. The network 106 may utilize different techniques and layers or stacks of protocols, including, e.g., the Ethernet protocol, and the internet protocol suite (TCP/IP). The TCP/IP internet protocol suite, may include application layer, transport layer, internet layer, or the link layer. The network 106 may be a type of broadcast network, a telecommunications network, a data communication network, or a computer network.

According to an implementation, the authentication server 102 may include a processor 108 and a memory 110. In an implementation, the processor 108 may be any logic circuitry that responds to and processes instructions fetched from the memory 110. In many embodiments, the processor 108 may be provided by a microprocessor unit.

The memory 110 may include one or more memory chips capable of storing data and allowing any storage location to be directly accessed by the processor 108. The memory 110 may be Dynamic Random-Access Memory (DRAM) or any variants, including static Random-Access Memory (SRAM). In some embodiments, the memory 110 may be non-volatile. The memory 110 may be based on any of the above-described memory chips, or any other available memory chips capable of operating as described herein.

In an implementation, the authentication server 102 may include a generating unit 112 and a comparison unit 114. In an implementation, the generating unit 112 and the comparison unit 114 may be coupled to the processor 108 and the memory 110. In some embodiments, the generating unit 112 and the comparison unit 114, amongst other units, may include routines, programs, objects, components, data structures, etc., which may perform particular tasks or implement particular abstract data types. The generating unit 112 and the comparison unit 114 may also be implemented as, signal processor(s), state machine(s), logic circuitries, and/or any other device or component that manipulates signals based on operational instructions.

In some embodiments, the generating unit 112 and the comparison unit 114 may be implemented in hardware, instructions executed by a processing unit, or by a combination thereof. The processing unit may comprise a computer, a processor, a state machine, a logic array or any other suitable devices capable of processing instructions. The processing unit may be a general-purpose processor that executes instructions to cause the general-purpose processor to perform the required tasks or the processing unit may be dedicated to performing the required functions. In some embodiments, the generating unit 112 and the comparison unit 114 may be machine-readable instructions that, when executed by a processor/processing unit, perform any of desired functionalities. The machine-readable instructions may be stored on an electronic memory device, hard disk, optical disk or other machine-readable storage medium or non-transitory medium. In an implementation, the machine-readable instructions may also be downloaded to the storage medium via a network connection. In an example, machine-readable instructions may be stored in the memory 110.

In an implementation, the authentication server 102 may include a database 116. The database 116 may store a lattice matrix, a bioquantum, and a hash value of a one-time secret key. In an example, the lattice matrix, the bioquantum, and the hash value of the one-time secret key stored in database 116 may be periodically or dynamically updated as required. In an implementation, the database 116 may include any type or form of storage, such as a database or a file system or coupled to the memory 110.

According to an implementation, the user computing device 104 may include a processor 122 and a memory 124. In an implementation, the processor 122 may be any logic circuitry that responds to and processes instructions fetched from the memory 124. In many embodiments, the processor 122 may be provided by a microprocessor unit, e.g., such as those manufactured by Intel Corporation of Mountain View, California; those manufactured by Motorola Corporation of Schaumburg, Illinois; the ARM processor or those manufactured by Advanced Micro Devices of Sunnyvale, California. The memory 124 may include one or more memory chips capable of storing data and allowing any storage location to be directly accessed by the processor 122. The memory 124 may be Dynamic Random-Access Memory (DRAM) or any variants.

In an implementation, the user computing device 104 may include a communication unit 126 and a computing unit 128. In an implementation, the communication unit 126 and the computing unit 128 may be coupled to the processor 122 and the memory 124. In some embodiments, the communication unit 126 and the computing unit 128, amongst other units, may include routines, programs, objects, components, data structures, etc., which may perform particular tasks or implement particular abstract data types. The communication unit 126 and the computing unit 128 may also be implemented as, signal processor(s), state machine(s), logic circuitries, and/or any other device or component that manipulates signals based on operational instructions.

In some embodiments, the communication unit 126 and the computing unit 128 may be implemented in hardware, instructions executed by a processing unit, or by a combination thereof. The processing unit may comprise a computer, a processor, a state machine, a logic array or any other suitable devices capable of processing instructions. The processing unit may be a general-purpose processor that executes instructions to cause the general-purpose processor to perform the required tasks or the processing unit may be dedicated to performing the required functions. In some embodiments, the communication unit 126 and the computing unit 128 may be machine-readable instructions that, when executed by a processor/processing unit, perform any of desired functionalities. The machine-readable instructions may be stored on an electronic memory device, hard disk, optical disk or other machine-readable storage medium or non-transitory medium. In an implementation, the machine-readable instructions may also be downloaded to the storage medium via a network connection. In an example, machine-readable instructions may be stored in the memory 124.

In the present disclosure, definitions of one or more terms that will be used in the document are provided below.

A. Integer-Lattice

Let $\mathcal{B} = \{b_i\}_{i=1}^n$ be the set of n linear independent vectors, where $\mathcal{B} \subset \mathbb{Z}_q^m$ (referred to as basis), where m≥n. The integer modulo prime q lattice $\mathcal{L}$ is defined as a discrete subgroup of $\mathbb{Z}_q^n$ and can be viewed as a set of linear combination.

$$\mathcal{L} = \{\mathcal{B} \mathbb{V}^t \pmod{q} \mid \mathbb{V} = (v_1, v_2, \ldots, v_m), v_i \in \mathbb{Z}_q\} \quad (1)$$

In the document, the matrix $\mathcal{B}$ is denoted as $\mathcal{M}$, and referred to as a lattice generator matrix of the lattice $\mathcal{L}$. A lattice is an abstract structure based on order theory and abstract algebra. The lattice consists of a partially ordered set in which every pair of elements has a unique supremum (least upper bound) and a unique infimum (greatest lower bound). A lattice matrix is a matrix having entries that belong to a distributive lattice, e.g., a Boolean matrix and fuzzy matrix.

B. Shortest Integer Solution (SIS) Problem

Given m uniformly random vectors $a_i \in \mathbb{Z}_q^n$, forming the columns of a matrix $A \in \mathbb{Z}_q^{n \times m}$, find a non-zero vector $z \in \mathbb{Z}^m$ of norm $\|z\| < \beta < q$ such that $$Az^t = 0 \in \mathbb{Z}_q^n \quad (2)$$

C. Learn with Error (LWE) Distribution

For a secret vector $s \in \mathbb{Z}_q^m$ and let $\chi$ be error distribution over $\mathbb{Z}$. The LWE distribution $\mathcal{A}_{s,\chi}$ over $\mathbb{Z}_q^m \times \mathbb{Z}_q$ is sampling by choosing $a_i \in \mathbb{Z}_q^n$ and $e \leftarrow \chi$ are uniformly at random and output.

$$b = As^t + e \pmod{q} \in \mathbb{Z}_q \quad (3)$$

D. Learn with Error (Search and Decision)

Given m independent samples $(a_i, b_i) \in \mathbb{Z}_q^n \times \mathbb{Z}_q$ drawn from $\mathcal{A}_{s,\chi}$ for a uniform random $s \in \mathbb{Z}_q^n$, finding a vector s is negligible.

E. Post-Quantum Fuzzy Commitment Scheme (PQFC)

Let $\mathcal{M} \in \mathbb{Z}_q^{n \times m}$ be a lattice generator matrix and $\mathcal{V} \in \mathbb{Z}_q^n$ is a secret vector chosen randomly. Let $\chi \subseteq \mathbb{Z}^m$ be the message space. The post-quantum fuzzy commitment function F: $\mathbb{Z}_q^n \times \chi \to \mathbb{Z}^m$ is defined as:

$$F(\mathcal{V}, x) = (\mathcal{V} \times_q \mathcal{M}) + x \quad (4)$$

where $x \xleftarrow{R} \chi$ is natural error distribution (biometric data/trait) and $\times_q$ denoted a modulo matrix multiplication.

F. Hash Function

A function $h: \{0,1\}^* \to \{0,1\}^k$ is called a secure cryptographic hash function if the following properties are fulfilled.

a) Easy to compute y for given x such that $y=h(x)$, but difficult to find x with given y
b) Collision-resistant: it is difficult to find $x \neq x'$ such that $h(x) = h(x')$ G. Biometric Metric Measurement Biometric metric measurement may be used to measure the similarity between two biometric samples. The metric Euclidean distance is calculated by comparing the features of the two samples and computing a numerical value, which represents the degree of similarity between them. This value can be used to determine whether or not the two samples are from the same person.

Euclidean Distance

Let u, $v \in \mathbb{R}^n$, then the squared Euclidean distance is defined as:

$$d^2(u, v) = \sum_{i=1}^{n} (u_i - v_i)^2 \quad (5)$$

Normalize Squared Distance

Let u, $v \in \mathbb{R}^n$, then the normalized squared distance is defined as:

$$\delta^2(u, v) = \frac{1}{2} \cdot \frac{\sigma^2(u-v)}{\sigma^2(u) + \sigma^2(v)} \quad (6)$$

Lemma 1.1. The normalized squared distance lies within the interval $0 \leq \delta^2 \leq 1$.

Proof: It is clear that $0 \leq \delta^2$ $$\sigma^2(u-v) = \frac{1}{n} \sum ((u-v) - \overline{(u-v)})^2 = \quad (7)$$

$$\frac{1}{n} \left\{ \sum (u-\bar{u})^2 + \sum (v-\bar{v})^2 - 2\sum (u-\bar{u})(v-\bar{v}) \right\} =$$

$$\sigma^2(u) + \sigma^2(v) - 2\text{conv}(u, v) \leq 2(\sigma^2(u) + \sigma^2(v))$$

Table 1 provided below describes notations used in the document.

TABLE 1

Notation used the document

| Symbol | Notation |
|---|---|
| $\mathbb{Z}$ | Set of Integer numbers |
| $\mathbb{Z}_q$ | Set of Integer numbers modulo q |
| $\xleftarrow{R}$ | Chosen uniformly random |
| $\sigma^2()$ | Variance |
| randMat( ) | Generate random matrix |
| randv( ) | Generate random vector |
| conv(u, v) | Convolution of u and v |
| $\bar{u}$ | Arithmetic mean of u |
| BioExt( ) | Biometric extraction features algorithm |
| Zros( ) | Generate zero vector |
| randperm( ) | Random permutation |
| randin( ) | Generate random integer |
| conv(u, v) | Convolution of u and v |
| $\bar{u}$ | Arithmetic mean of u |

According to an implementation, the system 100 may perform the passwordless authentication in two stages, namely a registration stage and an authentication stage.

In an embodiment, when a user wants to use the passwordless authentication, the user has to register with the authentication server 102. During the registration stage, a user of the user computing device 104 may send a request to the authentication server 102. In an example, the request may be to use passwordless authentication. In an implementation, the communication unit 126 of the user computing device 104 may send the request to the authentication server 102.

In response to receiving the request, the generating unit 112 may generate a lattice matrix. Further, the generating unit 112 may store the lattice matrix in the database 116. The generating unit 112 may return a lattice generator matrix (LGM) (denoted by "M") to the user computing device 104. In an embodiment, the generating unit 112 may generate a squared m×m nonsingular matrix A using nsub( ) function. The generating unit 112 may then choose an n vectors (rows) randomly from A to obtain the LGM. In an example, $n \leq m$.

In an embodiment, the generating unit 112 may execute an algorithm (provided below) for generating the LGM.

| Algorithm: PassLess.Auth. LGM.Gen( ): lattice generator matrix generation |
|---|
| Input: parameters n, m, and q (prime)<br>Output: Lattice Generator Matrix M<br>1. X$\xleftarrow{R}$randMat ($\mathbb{Z}_q^{m \times m}$)<br>2. [RC] = nsub (X,r)<br>3. A = X(R,C)<br>4. k = randperm (m)<br>5. M = A(k(1:n),:)<br>6. return M |

According to an embodiment, a biometric probe is configured to record at least one biometric data/trait from the user. For example, the at least one biometric trait is selected from a group including a fingerprint, a thumb print, a palm print, a retinal scan, an iris scan, a voice sample, a facial expression, or a combination thereof. In some examples, the biometric probe 110 is an iris scanner, a retinal scanner, a fingerprint scanner, a microphone, a facial scanner, a vein scanner, or a combination thereof. The computing unit 128 may compute a bioquantum (denoted by "ε") of biometric data/trait of the user based on the LGM using a post-quantum fuzzy commitment scheme (PQFC) and send the bioquantum to the authentication server 102 for storage in the database 116.

In an embodiment, the computing unit 128 may compute the bioquantum of the biometric data/trait of the user based on a biometric template and the LGM. A biometric template is a set of stored biometric features, typically of a face or fingerprint. To create a biometric template, a biometric sample is obtained through a capture device, e.g., a camera or fingerprint scanner. The captured biometric sample is converted into a mathematical file as the biometric template.

In an embodiment, the computing unit 128 may compute the bioquantum of the biometric data/trait of the user using Equation (8) provided below.

$$\varepsilon = (\mathbb{v} \times_q \mathcal{M}) + [\tau_r | 0] \qquad (8)$$

where, ε represents the bioquantum, ν represents a secret vector chosen randomly, $\tau_r$ represents the biometric template, M represents the LGM, $\times_q$ represents modulo matrix multiplication, and 0 is t-zero vector.

In an embodiment, the computing unit 128 may execute an algorithm (provided below) to compute the bioquantum of the biometric data/trait of the user.

| Algorithm: PassLess.Auth. Reg.User( ): |
|---|
| Input: $\mathcal{M} \in \mathbb{Z}_q^{n \times m}$, Biometric data $\mathcal{T}$<br>Output: bioquantum<br>1. v $\xleftarrow{R}$ randint($\mathbb{Z}_q^n$)<br>2. $\tau_r \leftarrow$ BioExt($\mathcal{T}$)<br>3. 0$\xleftarrow{R}$Zeros(t)<br>4. ε = (v $\times_q \mathcal{M}$) + [$\tau_r$|0]<br>5. store ε |

In an embodiment, when a biometric template for the user is stolen, the computing unit 128 may renew the face biometric of the user. In an embodiment, the computing unit 128 may execute an algorithm (provided below) for renewing the face biometric of the user.

| Algorithm: PassLess.Auth. Renew. User( ): |
|---|
| Input: $\mathcal{M} \in \mathbb{Z}_q^{n \times m}$, Biometric data $\mathcal{T}$<br>Output: new bioquantum<br>1. v$^{new}$ $\xleftarrow{R}$ randint ($\mathbb{Z}_q^n$)<br>2. $\tau_r$' $\leftarrow$ BioExt($\mathcal{T}$)<br>3. 0$\leftarrow$ Zeros(t)<br>4. ε$^{new}$ = (v$^{new}$ $\times_q \mathcal{M}$) + [$\tau_r$'|0]<br>5. store ε$^{new}$ |

In an embodiment, the computing unit 128 may calculate the post quantum fuzzy commitment using Equation (4) provided above.

$$F(\mathbb{v}, x) = (\mathbb{v} \times_q \mathcal{M}) + x \qquad (4)$$

where F represents the post quantum fuzzy commitment, M represents the LGM, ν represents a secret vector chosen randomly, x represents a natural error distribution and $\times_q$ represents modulo matrix multiplication.

During the authentication stage, the user may request to log in by sending a request for login to the authentication server 102. In an implementation, the communication unit 126 may send a request for login to the authentication server 102. In response to receiving the request for login, the generating unit 112 may generate a one-time secret key (denoted by "K"). The generating unit 112 may store the hash value of the one-time secret key (denoted by "h($\mathcal{K}$)") in the database 116. In an embodiment, the generating unit 112 may share the one-time secret key with the user of the user computing device 104 via a secure uniform resource locator (URL). Upon receiving the one-time secret key, the computing unit 128 may encapsulate the secret key with a biometric query to generate a new bioquantum (denoted by "ε̂"). In an embodiment, the computing unit 128 may compute the new bioquantum using the post-quantum fuzzy commitment (PQFC) scheme. In an example, the new bioquantum may interchangeably be referred to as keyed-bioquantum.

In an embodiment, the computing unit 128 may generate the new bioquantum using Equation (9) provided below.

$$\hat{\varepsilon} = (\mathbb{v} \times_q \mathcal{M}) + [\tau_q | \mathcal{K}] \qquad (9)$$

where, ε̂ represents the new bioquantum, ν represents a secret vector chosen randomly, $\tau_q$ represents the biometric query, M represents the LGM, $\times_q$ represents modulo matrix multiplication, and K represents the one-time secret key.

According to an embodiment, the comparison unit 114 may perform two indirect comparisons, namely, a first indirect comparison and a second indirect comparison. The comparison unit 114 may perform the first indirect comparison by comparing the new bioquantum against the stored bioquantum. Further, the comparison unit 114 may perform the second indirect comparison by retrieving hash values of the retrieved one-time secret key from the new bioquantum (i.e., the keyed-bioquantum) and the stored bioquantum. The comparison unit 114 may return the comparison results to the user computing device 104.

In an embodiment, the authentication server 102 may execute an algorithm (provided below) for authenticating the user.

---
Algorithm: PassLess.Auth. Auth.User( ):
---

Input: $\mathcal{M} \in Z_q^{n \times m}$, Biometric query data $\mathcal{T}$, secret vector $\mathbf{v}$, bioquantum $\varepsilon$
Output: Authentication result
1. $\mathcal{K} \xleftarrow{R} \text{randint}(\mathbb{Z}^t)$
2. $\tau_q \leftarrow \text{BioExt}(\mathcal{T})$
3. $\hat{\varepsilon} = (\mathbf{v} \times_q \mathcal{M}) + [\tau_r | \mathcal{K}]$
4. compute $\hat{h}(\mathcal{K})$
5. if $\hat{\varepsilon}_l \approx \varepsilon_l$
6. else Break
7. if $h(\hat{\varepsilon}_r - \varepsilon_r) = h(\mathcal{K})$ then
8. end if
9. return Result FIG. 2 illustrates a registration stage 200 for passwordless authentication, according to certain embodiments.

Figure 2:
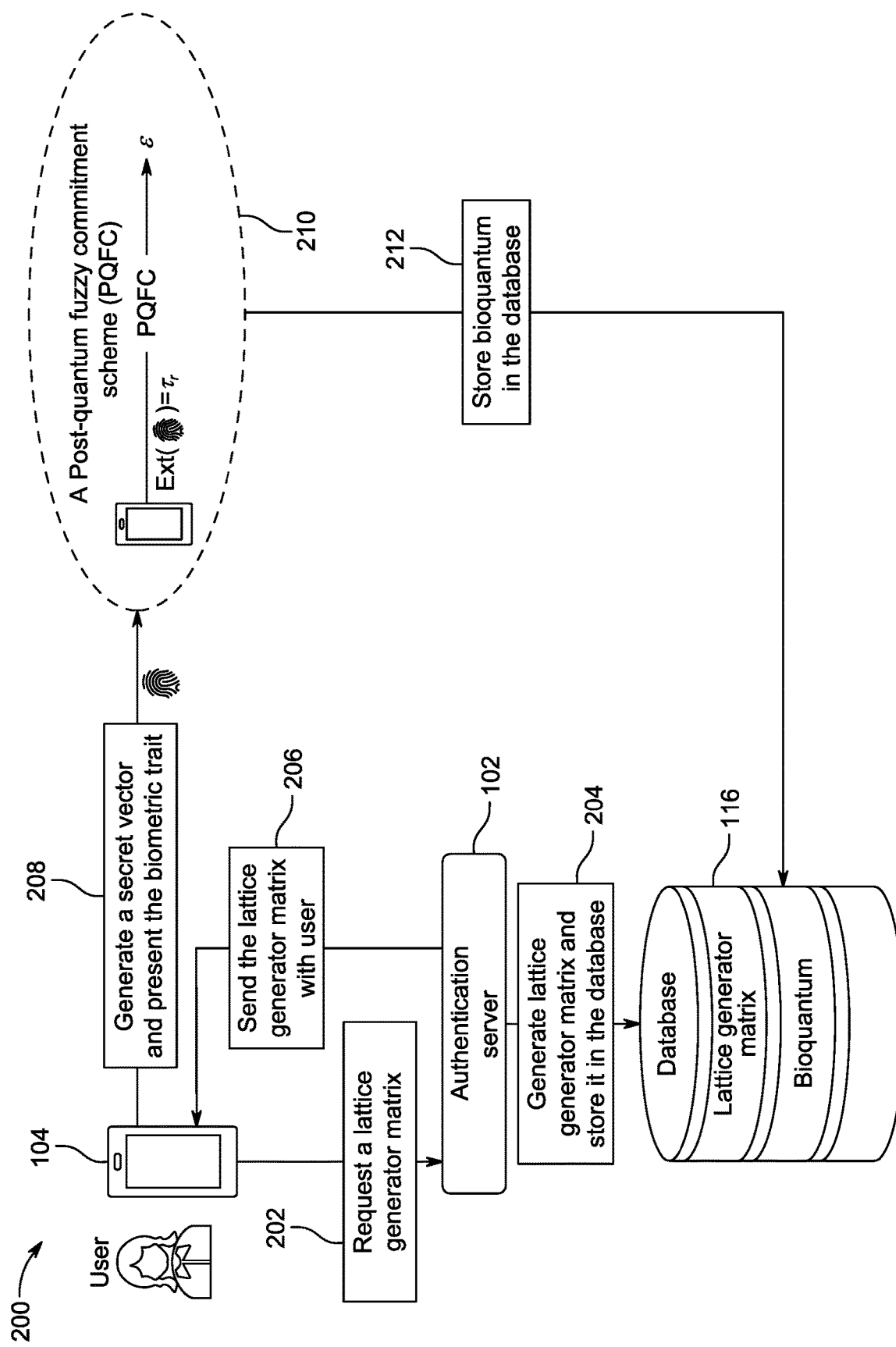
FIG. 2 illustrates a registration stage for passwordless authentication, according to certain embodiments.

In the embodiment shown in FIG. 2, at step 202 of the registration stage 200, a user of the user computing device 104 sends a request to the authentication server 102 to use the passwordless authentication (i.e., to generate the lattice generator matrix (LGM)) via the user computing device 104. At step 204 of the registration stage 200, the authentication server 102 generates the LGM and stores the LGM in the database 116. At step 206 of the registration stage 200, the authentication server 102 sends the LGM to the user. At step 208 of the registration stage 200, the user presents his or her biometric data (biometric trait) and feature extracted l (biometric template $\tau_r$). The user computing device 104 generates a secret vector. At step 210 of the registration stage 200, the user computing device 104 computes the bioquantum, $\varepsilon = (\mathbf{v} \times_q \mathcal{M}) + [\tau_r | 0]$ (where 0 is t—zero vector, such that $\ell + t = m$) and sends the bioquantum to the authentication server 102. In the example, the user computing device 104 computes the bioquantum using PQFC. At step 210 of the registration stage 200, the authentication server 212 stores the bioquantum in the database 116.

Figure 3:
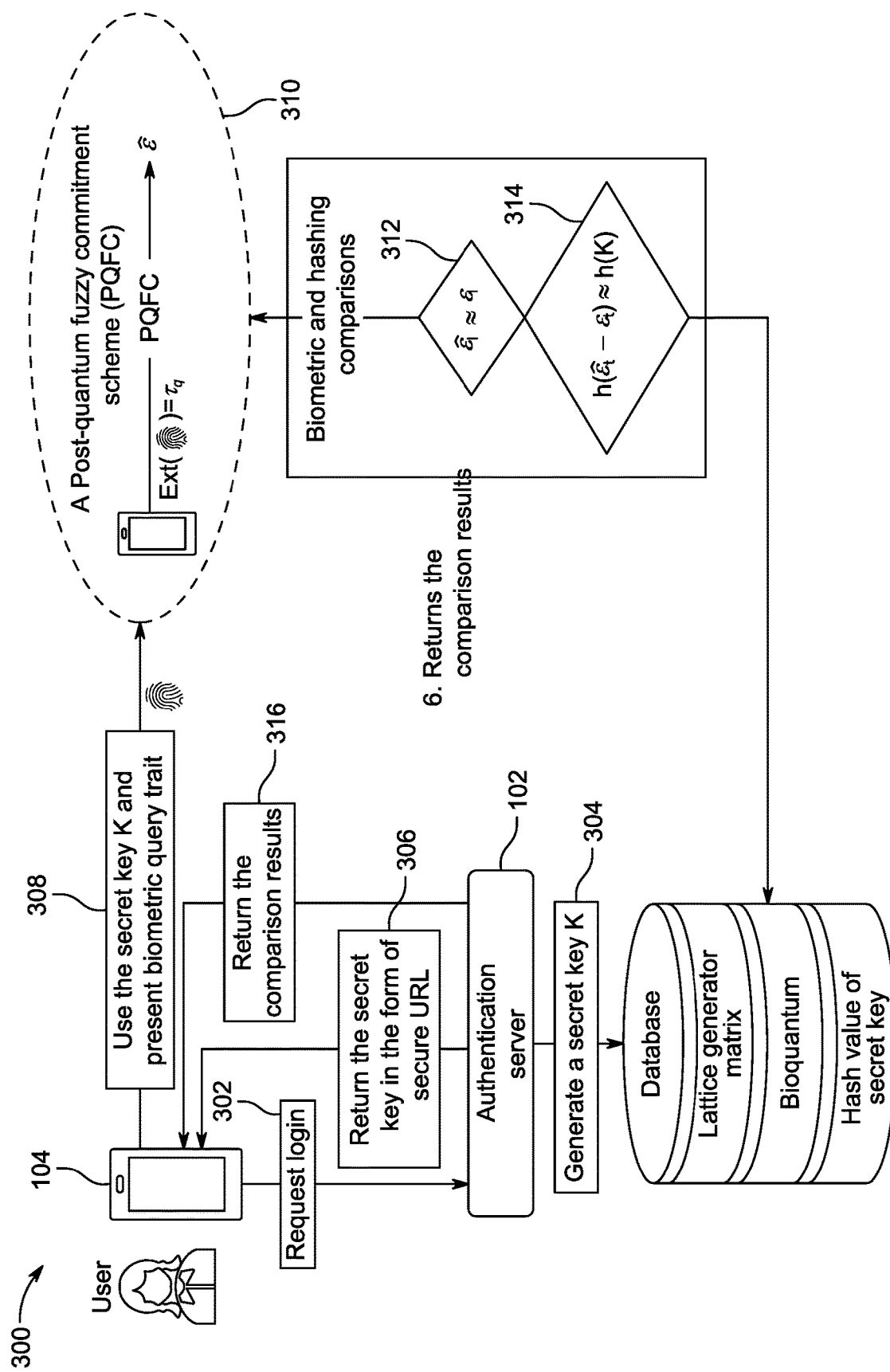
FIG. 3 illustrates an authentication stage for passwordless authentication, according to certain embodiments.

FIG. 3 illustrates an authentication stage 300 for passwordless authentication, according to certain embodiments.

In the example shown in FIG. 3, at step 302 of the authentication stage 300, a user of the user computing device 104 sends a request for login to the authentication server 102 via the user computing device 104. At step 304 of the authentication stage 300, the authentication server 102 generates an t-integer one-time secret key (denoted by "K"). The authentication server 102 stores the hash value of the one-time secret key (denoted by "H(K)") in the database 116. At step 306 of the authentication stage 300, the authentication server 102 sends (or returns) the secret key to the user computing device 104 in the form of secure URL. At step 308 of the authentication stage 300, the user presents his or her biometric data/trait and feature extracted l (biometric template $\tau_r$). In one embodiment, the user computing device 104 has a camera device, which is used to obtain a face image of the user. In one embodiment, the user computing device 104 has a fingerprint scanner, which is used to obtain a fingerprint image of the user. At step 310 of the authentication stage 300, the user computing device 104 computes a new bioquantum, $\hat{\varepsilon} = (\mathbf{v} \times_q \mathcal{M}) + [\tau_q | \mathcal{K}]$ using the secret key, and sends the new bioquantum to the authentication server 102. In an example, the user computing device 104 computes the new bioquantum using the PQFC. Thereafter, the authentication server 102 performs indirect comparisons (i.e., biometric and hashing comparisons). At step 312 of the authentication stage 300, the authentication server 102 performs the indirect biometric matching $\hat{\varepsilon}_\ell \approx \varepsilon_\ell$. If there is biometric matching, then at step 314 of the authentication stage 300, the authentication server 102 computes and compares $h(\hat{\varepsilon}_\ell - \varepsilon_\ell) \approx h(\mathcal{K})$. At step 314 of the authentication stage 300, the authentication server 102 sends (or returns) the comparison results to the user computing device 104.

Examples and Experiments

The following examples are provided to illustrate further and to facilitate the understanding of the present disclosure.
Experimental Data and Analysis For experimental validation of the passwordless authentication method, the AT&T face biometrics dataset known as the ORL dataset of faces can be considered. In the AT&T face biometrics dataset, there are 400 face images from different 40 subjects, with 10 face samples images captured per subject each of size 92×112, 8-bit grey levels. Each face image goes through a face extraction algorithm to produce face template $\in Z^l$. The passwordless authentication method can be implemented in MATLAB R2021b. To generate the lattice generator matrix (LGM), $\mathcal{M} \in Z_q^{n \times m}$, a squared non-singular matrix A is first created using the algorithm nsub ( ), then an n—rows from A are chosen randomly to obtain the LGM, (where n<m). In a registration stage, an 1×n vector, $\mathbf{v} \in \mathbb{Z}_q^n$ was chosen randomly and the bioquantum, $\varepsilon = (\mathbf{v} \times_q \mathcal{M}) + [\tau_r | 0]$, where 0 is a t—zero vector, such that l+t=m is computed (for example, by the user computing device 104). In an authentication stage, one-time secret key, $\mathcal{K} \in Z^t$ is generated randomly (for example, by the authentication server 102), where the hash value $h(\mathcal{K})$ is stored in a database (for example, in the database 116). A new bioquantum (or the keyed-bioquantum), $\hat{\varepsilon} = (\mathbf{v} \times_q \mathcal{M}) + [\tau_q | \mathcal{K}]$ is computed (for example, by the user computing device 104), and sent to an authentication server (for example, to the authentication server 102) for comparison.

For the passwordless authentication method, parameters in CRYSTALS-Kyber are followed, where n=256 and q=3329. Further, SHA3-256 cryptographic hash function is used. The performance metric measurements of classical biometric system, the false rejection rate (FRR) and the false accepting rate (FAR) are applied as performance metrics for the indirect biometric matching in the passwordless authentication method. The FRR is defined as the rate of incorrect keys reverting to genuine users and the FAR is defined as the rate of correct keys reverting to imposter users.

Further, the face templates of length, l=248 integers each are extracted. The face templates file consisted of 10 templates per user. One template is randomly selected for the passwordless authentication method enrollment. Then the bioquantum $\varepsilon$ is computed using the PQFC scheme. To compute the FRR of the passwordless authentication method, the remaining nine face templates are used to compute the new bioquantum (or keyed-bioquantum) $\hat{\varepsilon}$ for the authentication. As a result, there are $40 \times {}_{10}C_2 = 1800$ bioquantum comparisons. For the FAR calculation, there are $10^2 \times {}_{128}C_2 = 78000$ bioquantum comparisons. The Euclidean distance metric is used for comparison. The Euclidean distance metric is mathematically represented using Equation (10) provided below.

$$D(\hat{\varepsilon}_\ell, \varepsilon_\ell) = |\hat{\varepsilon}_\ell - \varepsilon_\ell|_2 = \sum_{i=1}^{\ell} \sqrt{(\hat{\varepsilon}_i - \varepsilon_i)^2} \quad (10)$$

The distance D is then normalized using the Equation (11) provided below.

$$\delta^2(\hat{\varepsilon}_\ell, \mathcal{E}_\ell) = \frac{1}{2} \cdot \frac{\sigma^2(\hat{\varepsilon}_\ell - \mathcal{E}_\ell)}{\sigma^2(\hat{\varepsilon}_\ell) + \sigma^2(\mathcal{E}_\ell)} \quad (11)$$

where $\sigma^2$ represents the variance and $\mathcal{E}_\ell$ represents the first $\ell$-integers in the bioquantum ε.

If the biometric matching is successful, then the final hash value comparison $h(\hat{\varepsilon}_t - \varepsilon_t) = h(\mathcal{K})$ is performed using the crypto hash function SHA3-256. For evaluation purpose, the passwordless authentication method implemented in two phases, namely a first phase and a second phase.

According to the first phase, the same secret vector v is used to compute $\varepsilon_\ell$ and $\hat{\varepsilon}_\ell$ for both genuine and imposter distributions computations. It is found that the accuracy performance of the protected biometrics templates is preserved with accuracy of 94.73% (EER=0.0527), and a FAR of 0.19% and an FRR equaling 2.5% at the threshold of 30% is achieved. In addition, theoretical analysis proved that the accuracy performance preserved $\|\hat{\varepsilon}_\ell - \varepsilon_\ell\|_2 = \|\tau_q - \tau_r\|_2$. If the biometric matching is successful and with the assumption that no attack is performed on the secret key K, then the secret key is retrieved successfully, $h(\hat{\varepsilon}_\ell - \varepsilon_\ell) = h(\mathcal{K})$.

Figure 4A:
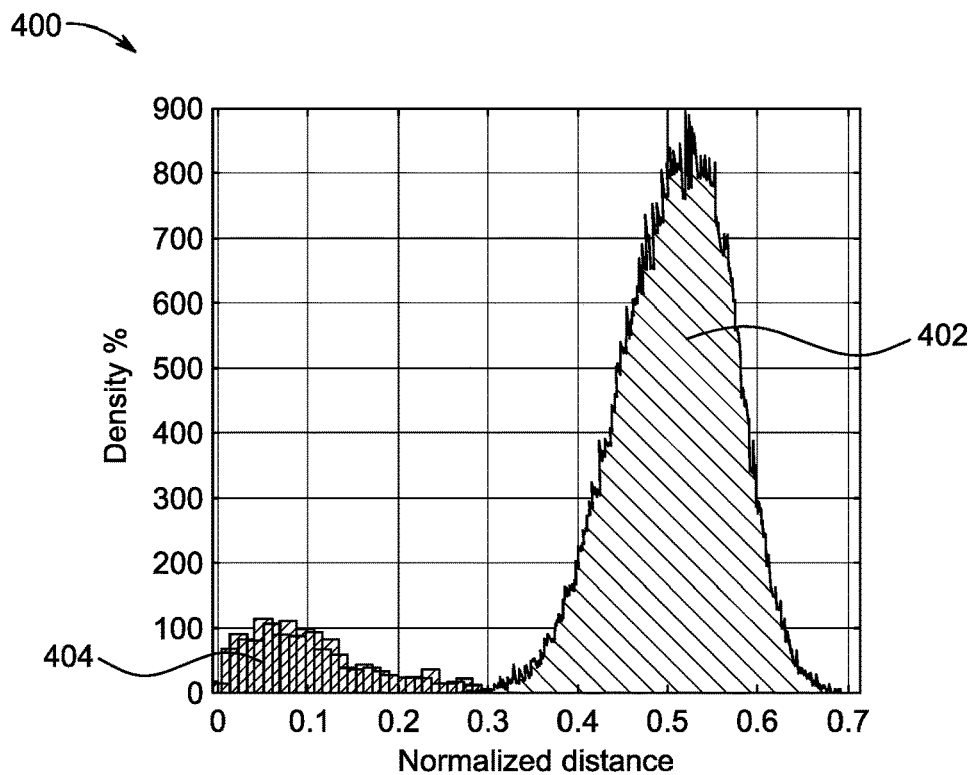
FIG. 4A to FIG. 4C illustrate graphical measurement results of biometrics recognition for a first phase in a passwordless authentication method, according to certain embodiments.
Figure 4B:
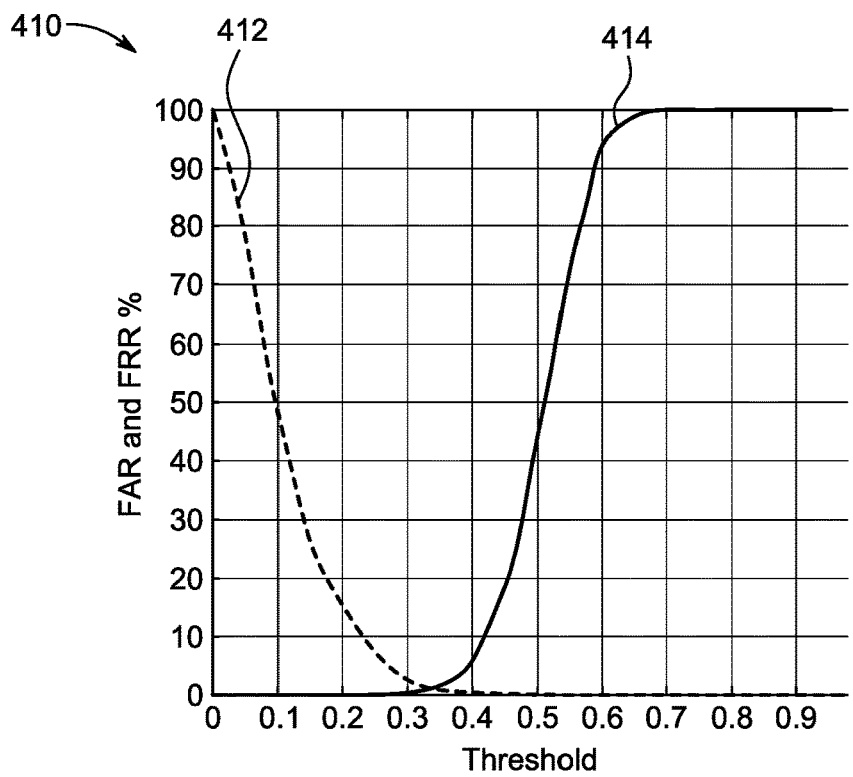
Figure 4C:
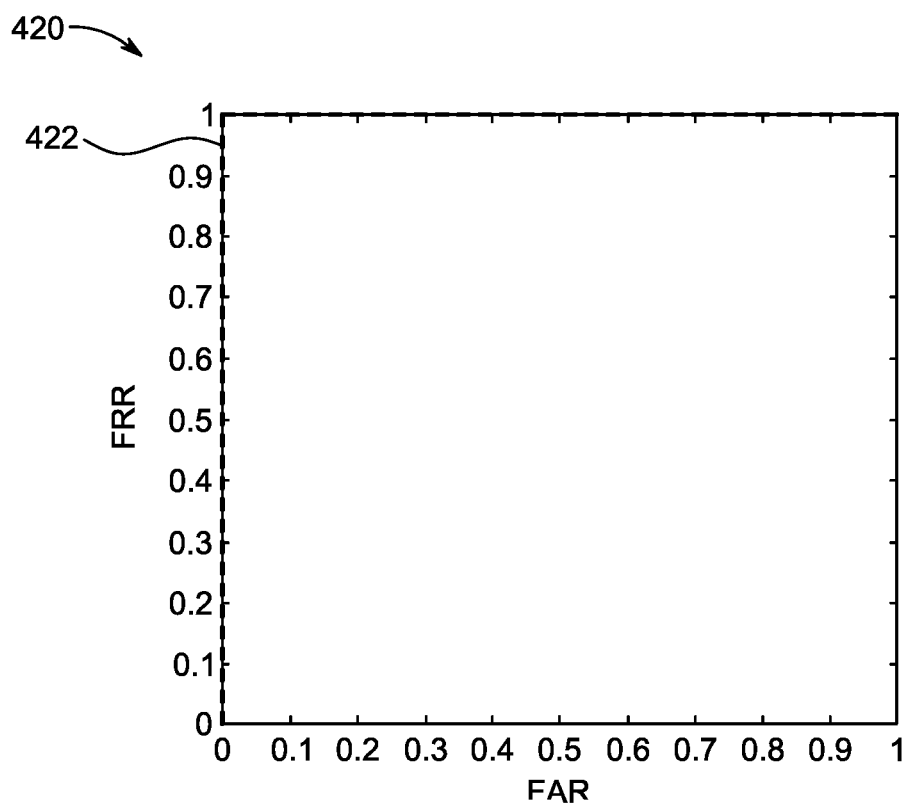

FIG. 4A to FIG. 4C illustrate graphical measurement results of the biometrics recognition for the first phase in the passwordless authentication method, according to certain embodiments. In particular, FIG. 4A illustrates a graphical representation 400 of the first phase performance result for genuine and imposter distributions. In the example shown in FIG. 4A, the first phase performance result for the imposter distribution is represented by reference numeral "402" and the first phase performance result for the genuine distribution is represented by reference numeral "404". FIG. 4B illustrates a graphical representation 410 of the first phase performance result for FAR and FRR curves. In the example shown in FIG. 4B, the first phase performance result for the FRR curve is represented by reference numeral "412" and the first phase performance result for the FAR is represented by reference numeral "414". FIG. 4C illustrates a graphical representation 420 of the first phase performance result for the receiver operating characteristic (ROC) curve. In the example shown in FIG. 4C, the first phase performance result for the ROC curve is represented by reference numeral "422".

According to the second phase, different secret vectors $v_1$ and $v_2$ are used to compute $\varepsilon_\ell$ and $\hat{\varepsilon}_\ell$ for imposter distributions computations. It is assumed that the imposter user has no understanding about the genuine secret vector. As a result, the protected biometric accuracy performance is improved more than the unprotected biometrics. The passwordless authentication method achieved excellent result of 100% accuracy performance, with FRR of 0% and FAR of 0%

Figure 5A:
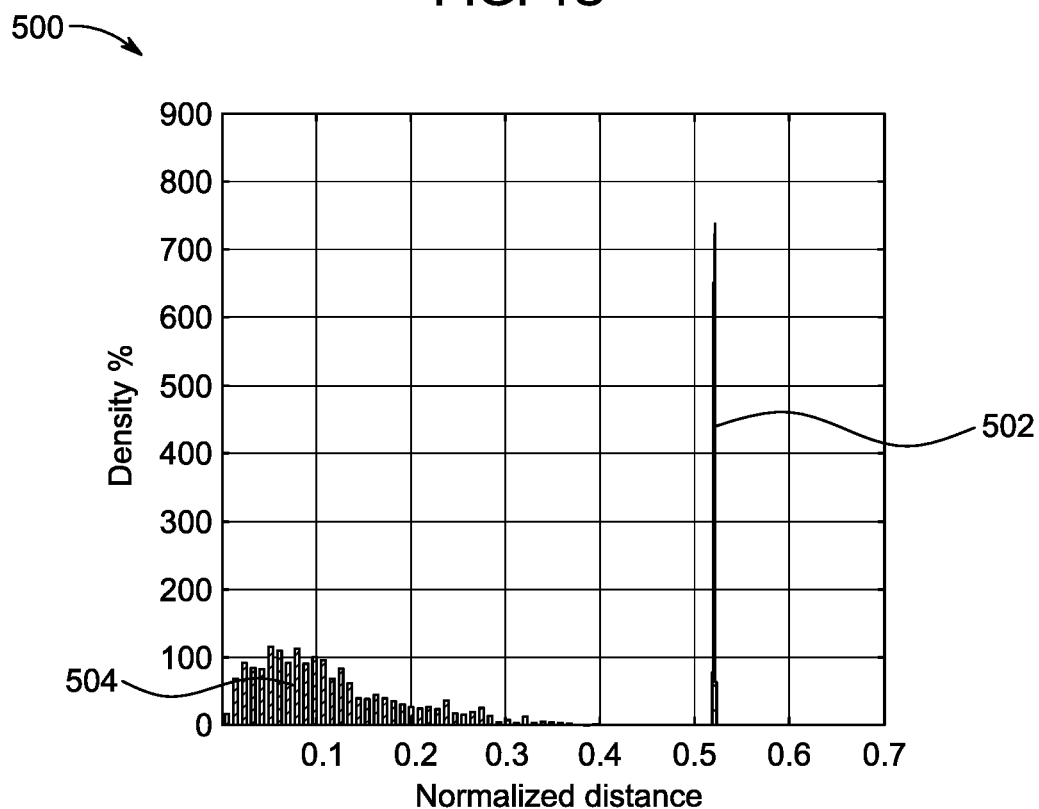
FIG. 5A to FIG. 5C illustrate graphical measurement results of biometrics recognition for a second phase in the passwordless authentication method, according to certain embodiments.
Figure 5B:
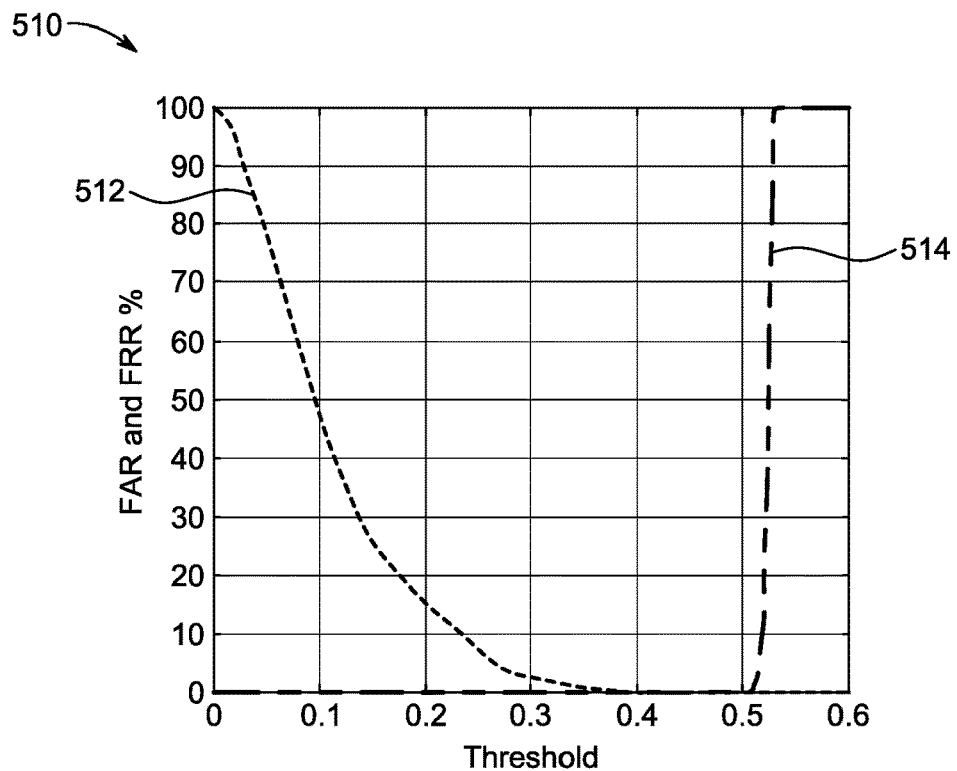
Figure 5C:
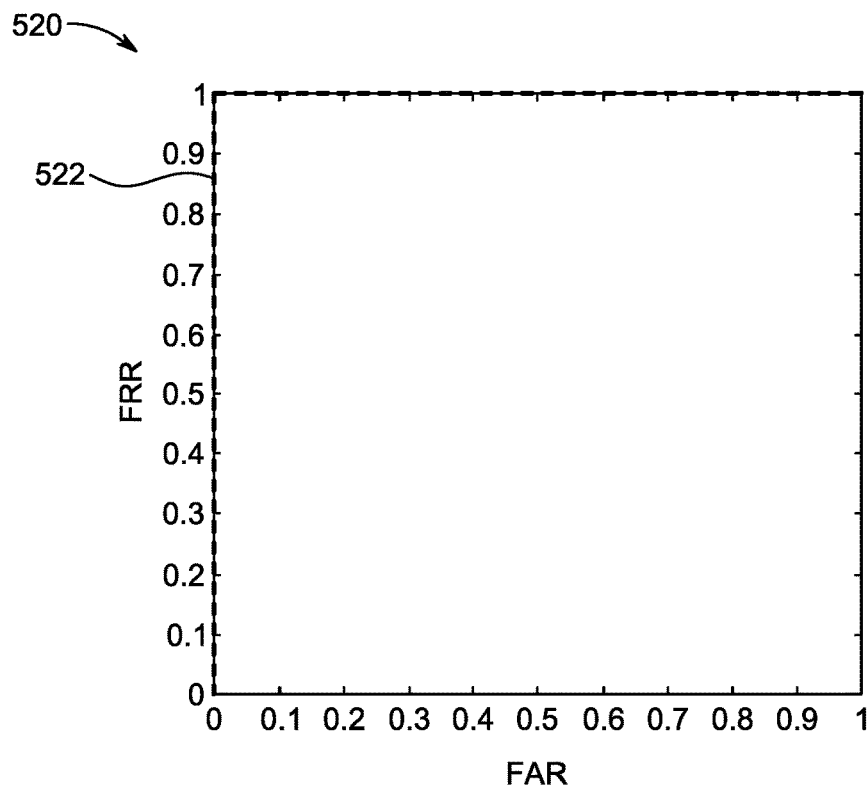

FIG. 5A to FIG. 5C illustrate graphical measurement results of the biometrics recognition for the second phase in the passwordless authentication method, according to certain embodiments.

In particular, FIG. 5A illustrates a graphical representation 500 of the second phase performance result for genuine and imposter distributions. In the example shown in FIG. 5A, the second phase performance result for the imposter distribution is represented by reference numeral "502" and the second phase performance result for the genuine distribution is represented by reference numeral "504". FIG. 5B illustrates a graphical representation 510 of the second phase performance result for FAR and FRR curves. In the example shown in FIG. 5B, the second phase performance result for the FRR curve is represented by reference numeral "512" and the second phase performance result for the FAR is represented by reference numeral "514". FIG. 5C illustrates a graphical representation 520 of the second phase performance result for the receiver operating characteristic (ROC) curve. In the example shown in FIG. 5C, the second phase performance result for the ROC curve is represented by reference numeral "522". The results shown in FIGS. 4A, 4B, 4C, 5A, 5B, and 5C were obtained by executing the implementation on Intel® Core™ i7-10700 CPU @ 2.90 GHz, RAM 16.0 GB.

Figure 6:
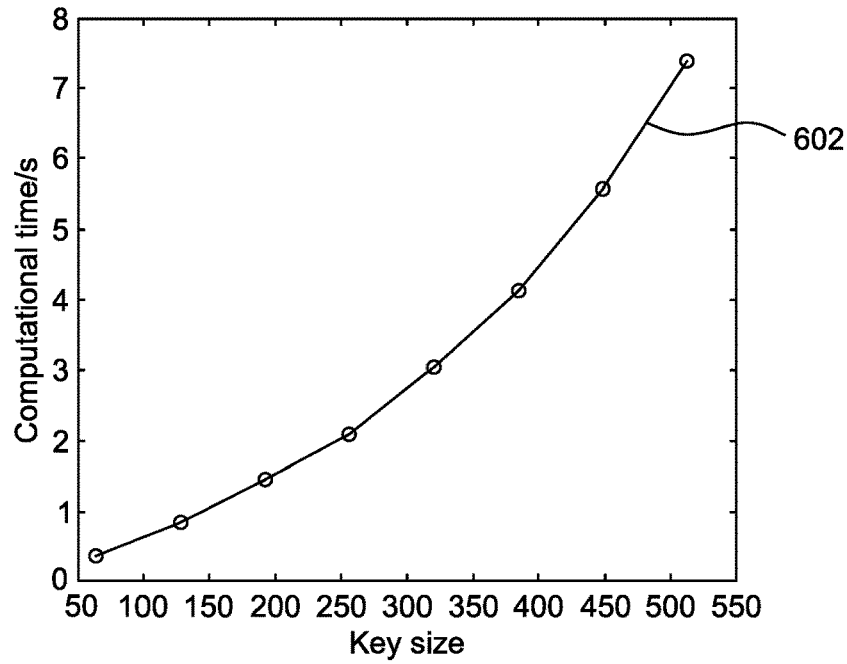
FIG. 6 illustrates a graphical representation showing computational time estimation for lattice generation matrix (LGM) generation using different secret key size, according to certain embodiments.

FIG. 6 illustrates a graphical representation 600 showing computational time estimation for LGM generation using different secret key size, according to certain embodiments. In the example shown in FIG. 6, the curve 602 represents the computational time estimation for LGM generation. The value m= $\ell$ +t is adjusted according to the concatenation size of the one-time secret key K and the face features τ. Since the size of face template is fixed i.e., l=248, different length of the secret key was set, such as t=[64 128 192 256 320 384 448 512].

The security of the system 100 is based on the security of the PQFC scheme. The PQFC scheme is an efficient and secure cryptographic primitive that was constructed for biometric template protection. Unlike the conventional biometric template protection schemes, the PQFC scheme is based on lattice-based cryptography and does not rely on error-correcting codes. The passwordless authentication method of the present disclosure achieved the most important security properties of PQFC namely, hiding and binding properties.

Theorem 1—Hiding Property: For a given two random face templates τ and τ'.

Let $\chi(\mathbb{v},\tau)$ and $\chi(\mathbb{v},\tau')$ be two random distributions generated using PQFC function over the same sample space Ω. If there is an imposter, an all-powerful probabilistic polynomial-time algorithm that can distinguish between τ and τ' except in statistical distance with negligible probability η is considered.

$$\Delta(X(\mathbb{v}, \tau), X(\mathbb{v}, \tau')) \leq \frac{1}{2^m + 1 q^m} \sum_\omega \left| \omega_{\varepsilon_1, \tau_1} - \omega_{\varepsilon_2, \tau_2} \right| = \eta \quad (12)$$

where $\omega_{\varepsilon_1,\tau_1}$ represents the size of set $\{\mathbb{v} : F(\mathbb{v},\tau_1) = \varepsilon_1\}$.

Lemma 2—If "th" represents the threshold of the face-based biometric recognition, then for any genuine $\tau_q$ such that $\delta^2(\tau_q,\tau_r) \leq$ th can be used to retrieve the correct secret key K.

Proof: Since $\delta^2(\tau_q,\tau_r) \leq$ th, it follows Equation (13) and Equation (14).

$$\delta^2(\hat{\varepsilon}_\ell, \mathcal{E}_\ell) = \|((\mathbb{v} \times_q \mathcal{M}) + \tau_q) - ((\mathbb{v} \times_q \mathcal{M}) + \tau_r)\| \leq th \quad (13)$$

$$h(\hat{\varepsilon}_t - \varepsilon_t) = h((\mathbb{v}\mathcal{M} + \mathcal{K}) - (\mathbb{v}\mathcal{M} + 0)) = h(\mathcal{K}) \quad (14)$$

Theorem 2—Binding Property: For a given matrix $\mathcal{M} \in \mathbb{Z}_q^{n \times m}$ and $\varepsilon \in \mathbb{Z}^m$.

If $\mathbb{v} \in \mathbb{Z}_q^n$ be a vector is used to encapsulate two face templates τ,τ'∈ Γ generated from two distinct subjects such that $F(\mathbb{v},\tau) = F(\mathbb{v},\tau')$ and $\delta^2(\tau,\tau') >$ th, then shortest integer solution (SIS) and learn with error (LWE) problems can be solved.

The resistance of the passwordless authentication method against several attacks that may threaten security and privacy is discussed below.

An authorized entity that has the authorization to access the security perimeter resources and uses them in an unwanted way is called an insider attack. In the passwordless authentication method of the present disclosure, the authorized entity has no access to the biometric template and the one-time secret key as they are stored in the encrypted domain i.e., bioquantum, and hash value of the secret key. Further, the use of similarity-based attacks on biometric template protection allows unauthorized individuals to find a preimage of the protected template that is close to the original template in a suitable distance metric. A machine learning algorithm can be used to estimate the original biometric template through the distance metric preserving property of the biometric template protection schemes. This can be achieved by generating random synthetic biometric templates $\hat{T} = \{\hat{\tau}_1, \hat{\tau}_2, \ldots \hat{\tau}_k\}$ and computing their corresponding value $\hat{\varepsilon} = \{\hat{\varepsilon}_1, \hat{\varepsilon}_2, \ldots \hat{\varepsilon}_l\}$. Having information of $\{\varepsilon_1, \varepsilon_2, \ldots, \varepsilon_k\}$, an attacker can compute the distance distributions $\delta^2 = \{\delta_i^2(\varepsilon_i, \hat{\varepsilon}_j) | i=1, 2, \ldots, k \text{ and } j=1, 2, \ldots l\}$ and then the attacker can find the nearest $\hat{\tau}_j$ to original template $\tau_i$. However, to run the similarity attacks in the system 100, an imposter has to solve the SIS problem to find the secret key $v$ to be able to compute $\hat{\varepsilon}_j$. Therefore, the system 100 is resistant to similarity attacks.

Stored biometric template attacks are a serious problem because of the way that biometric data is stored on devices. Currently, these devices do not adequately to protect the biometric templates from unauthorized access. In the passwordless authentication method of the present disclosure, the biometric templates are protected as bioquantum using the PQFC scheme. Further, in recent years, there has been an increasing focus on the man-in-middle attack (MIM). This attack occurs when an attacker uses past interactions with a system, such as a user input or data saved by the user, to compromise future interactions with that system. In the passwordless authentication method of the present disclosure, the secret key is time-key sharing and then encapsulated through the PQFC scheme. If a MIM attacker learns the one-time secret key sent by the authentication server, the MIM attacker will be unable to construct its encapsulation as well as will not be able to pass the biometrics recognition.

Spoofing is the practice of deceiving a biometric system using unauthorized biometric data. For example, an attacker can capture the face of a genuine user using hidden cameras. Spoofing can be used to unlock a biometric-based authentication system. However, if the attacker steals a copy of the genuine face, the attacker will not be able to impersonate the genuine user because the attacker has to compute the bioquantum of the face. This can be done only if the attacker can break the SIS and LWE problems of lattice-based cryptography.

Brute force attacks are "guess and check" attacks that exploit weak passwords. For the the passwordless authentication method of the present disclosure, these attacks can be performed either online by attempting to login into an authentication system, or offline by testing potential one-time secret keys, biometric templates, and secret vectors. Therefore, the brute force attack is impossible to breach the security of the system 100 due to the high computational time required.

The security and privacy requirements of biometric template protections of the ISO/IEC24745 standard, namely, unlinkability, invertibility, and renewability are discussed below.

According to the ISO/IEC24745 standard, the unlinkability property is defined as "if two or more biometric references that they cannot be linked to each other or to the subject(s) from whom they were derived". To evaluate the unlinkability of the system 100, two distributions mated_dist and non-mated_dist are computed for the ORL dataset. The distribution mated_dist and the distribution non-mated_dist are computed using the Equation (15) and the Equation (16), respectively.

$$\text{mated\_dist} = \qquad (15)$$
$$\{\delta^2(\varepsilon_1, \varepsilon_2) | \varepsilon_1 = F(v_1, \tau_i^a), \varepsilon_2 = F(v_2, \tau_j^a), i \neq j = 1, 2, \ldots 10\}$$

$$\text{non-mated\_dist} = \qquad (16)$$
$$\{\delta^2(\varepsilon_1, \varepsilon_2) | \varepsilon_1 = F(v_1, \tau_i^a), \varepsilon_2 = F(v_2, \tau_j^a), i, j = 1, 2, \ldots, 10\}$$

where $\tau_i^a$ and $\tau_j^b$ are biometric templates generated from different users.

Figure 7:
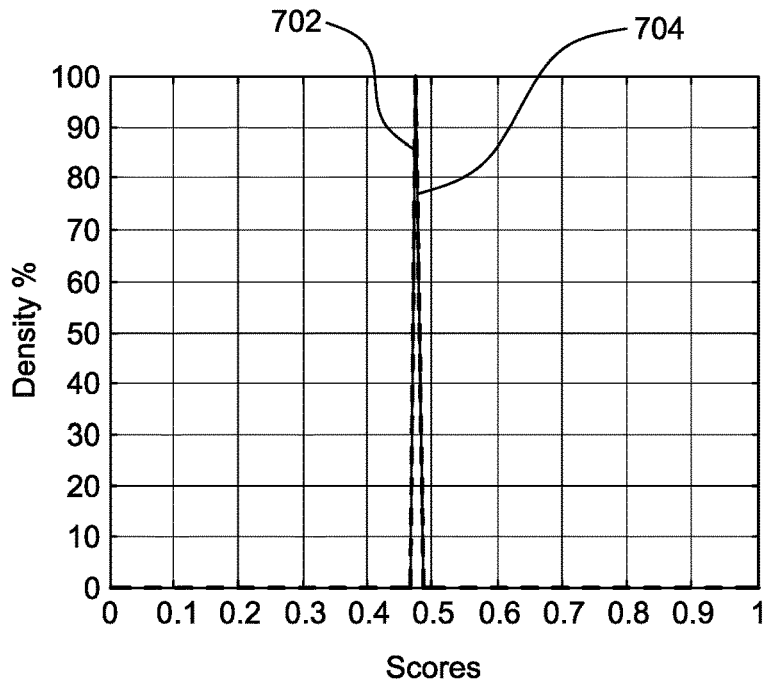
FIG. 7 illustrates a graphical representation showing unlinkability evaluation of the passwordless authentication, according to certain embodiments.

FIG. 7 illustrates a graphical representation 700 showing unlinkability evaluation of the passwordless authentication, according to certain embodiments. In particular, FIG. 7 shows that the two distributions mated_dist and non-mated_dist are fully overlapping. As a result, the passwordless authentication of the present disclosure is fully unlinkable. In the example shown is FIG. 7, the distribution mated_dist is represented by reference numeral "702" and the distribution non-mated_dist is represented by reference numeral "704".

The irreversibility property of biometric template protection states that if a protected biometric template and an unprotected template of the same biometric data are compared, they always yield the same results. The irreversibility property means that the biometric template cannot be compromised from the encapsulated bioquantum stored on the database (for example, the database 116). An attacker who has access to the bioquantum cannot recover the original biometric template because of the hardness of the PQFC and then the passwordless authentication method of the present disclosure achieves the irreversible property.

Figure 8:
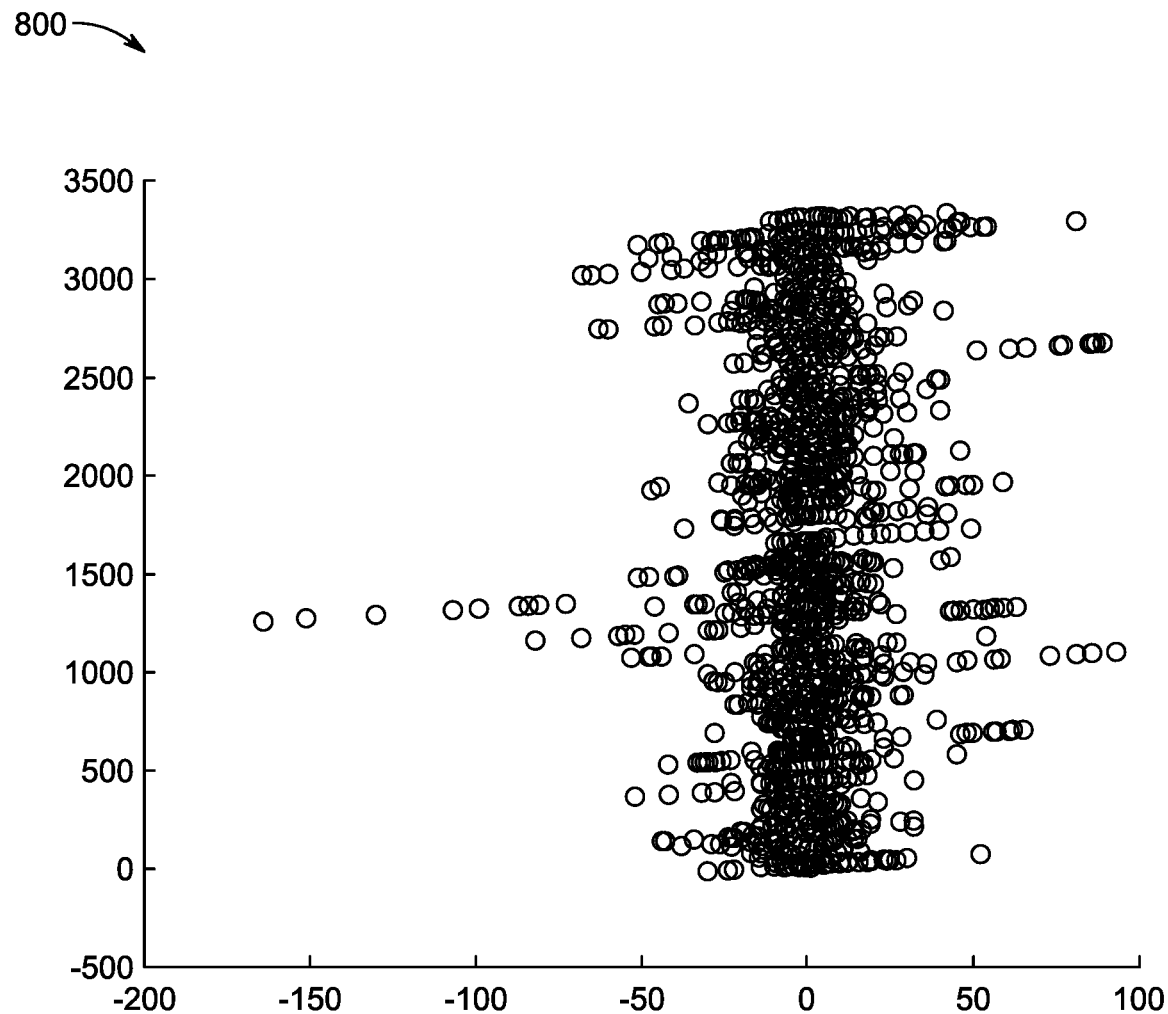
FIG. 8 illustrates a scatter diagram of protected and unprotected biometric templates, according to certain embodiments.

FIG. 8 illustrates a scatter diagram 800 of the protected and unprotected biometric templates, according to certain embodiments. It is proved that there is no correlation between the protected and unprotected biometric templates. The correlation coefficient of 0.02. Therefore, the irreversibility property is achieved.

In an example, unlike the password method that expires after a period of time and must be changed, biometrics remain constant throughout an individual's lifetime and does not need to be replaced or updated when the person changes his or her identity. However, according to the passwordless authentication method of the present disclosure, a user can renew his or her biometric data by simply choosing a new different secret vector to register a new bioquantum.

Table 2 provided below shows a comparison between the system 100 and conventional passwordless authentication systems. The comparison is made based on the security and privacy properties and functionality feature. Table 2 shows that the system 100 is more secure against well-known serious attacks and quantum computing attacks in comparison to the existing passwordless authentication systems. Further, the system 100 is efficient in comparison to the existing passwordless authentication systems.

TABLE 2

Security and functionality properties comparisons of the system
100 and conventional passwordless authentication systems

|  | P1 | P2 | P3 | P4 | P5 | P6 | P7 | F1 | F2 | F3 |
|---|---|---|---|---|---|---|---|---|---|---|
| FIDO | No | No | No | No | Yes | T-PKC | Limited | No | No | Yes |
| Apple Passkeys | No | No | No | No | Yes | T-PKC | Limited | No | No | Yes |
| System 100 | Yes | Yes | Yes | Yes | Yes | LBC | Unlimited | Yes | Yes | Yes |

In the above Table 2, P1 represents resistance to stored biometric template, P2 represents resistance to quantum computing attacks, P3 represents resistance to the MIM attacks, P4 represents resistance to biometric spoofing, P5 represents resistance to brute-force attacks, P6 represents security complexity, P7 represents the secret key size, F1 represents compatible with all applications, F2 represents costless implementation, and F3 represents user-friendly.

According to aspects of the present disclosure, the system 100 enables users to securely authenticate to services without the need to remember passwords or keys. The system 100 employs the PQFC scheme to create a secure connection between a user and a service provider. The system 100 was evaluated using face-based biometric ORL dataset to secure one-time secret key of any size. According to the experimental data, the accuracy performance of 94.73%, a FAR of 0.19% and an FRR of 2.5% was achieved in the first phase, which preserved the accuracy recognition of unprotected methods. A good performance was achieved in the second phase (i.e., the accuracy of 100% with a FAR 0% and the FRR of 0% was achieved). The execution time for the LGM generation for different sizes of the one-time secret key was estimated. The security and privacy of the system 100 were evaluated theoretically and experimentally, which showed that the system 100 is resistant not only to the interior, stored biometric, biometric spoofing, MIM, Brute force, and similarity-based attacks but also resistant to upcoming quantum computing attacks. Experimental results showed that the system 100 achieved unlinkability, irreversibility, and renewability properties of the ISO/IEC 24745 standard.

Figure 9:
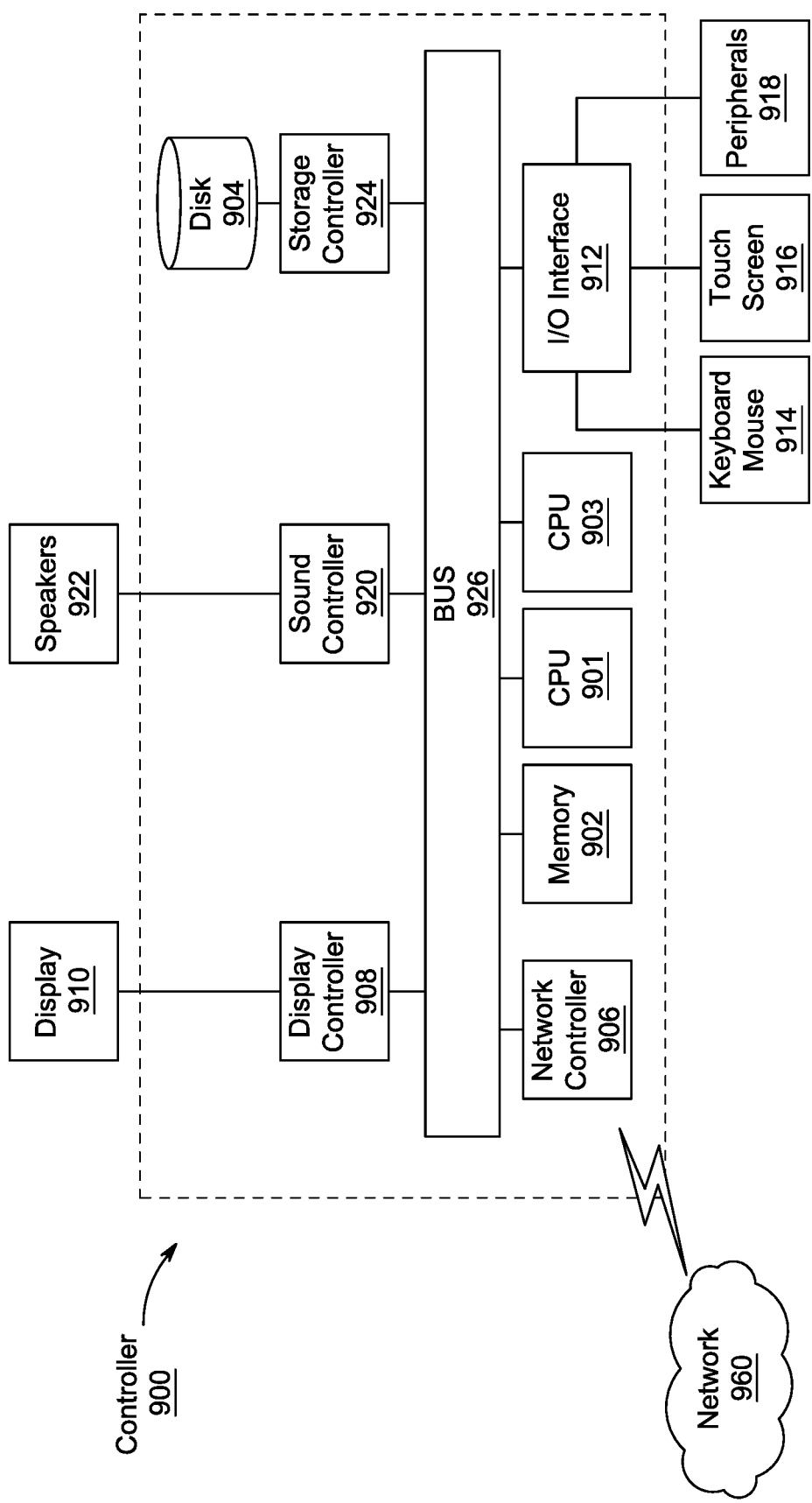
FIG. 9 is an illustration of a non-limiting example of details of computing hardware used in the computing system, according to certain embodiments.

FIG. 9 is an illustration of a non-limiting example of details of computing hardware used in the computing system, according to exemplary aspects of the present disclosure. In FIG. 9, a controller 900 is described which is a computing device and includes a CPU 901 which performs the processes described above/below. The process data and instructions may be stored in memory 902. These processes and instructions may also be stored on a storage medium disk 904 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 901, 903 and an operating system such as Microsoft Windows 7, UNIX, Solaris, LINUX, Apple MAC-OS and other systems known to those skilled in the art.

The hardware elements in order to achieve the computing device may be realized by various circuitry elements, known to those skilled in the art. For example, CPU 901 or CPU 903 may be a Xenon or Core processor from Intel of America or an Opteron processor from AMD of America, or may be other processor types that would be recognized by one of ordinary skill in the art. Alternatively, the CPU 901, 903 may be implemented on an FPGA, ASIC, PLD or using discrete logic circuits, as one of ordinary skill in the art would recognize. Further, CPU 901, 903 may be implemented as multiple processors cooperatively working in parallel to perform the instructions of the inventive processes described above.

The computing device in FIG. 9 also includes a network controller 906, such as an Intel Ethernet PRO network interface card from Intel Corporation of America, for interfacing with network 960. As can be appreciated, the network 960 can be a public network, such as the Internet, or a private network, such as an LAN or WAN network, or any combination thereof and can also include PSTN or ISDN subnetworks. The network 960 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 908, such as a NVIDIA Geforce GTX or Quadro graphics adaptor from NVIDIA Corporation of America for interfacing with display 910, such as a Hewlett Packard HPL2445w LCD monitor. A general purpose I/O interface 912 interfaces with a keyboard and/or mouse 914 as well as a touch screen panel 916 on or separate from display 910. General purpose I/O interface also connects to a variety of peripherals 918 including printers and scanners, such as an OfficeJet or DeskJet from Hewlett Packard.

A sound controller 920 is also provided in the computing device such as Sound Blaster X-Fi Titanium from Creative, to interface with speakers/microphone 922 thereby providing sounds and/or music.

The general-purpose storage controller 924 connects the storage medium disk 904 with communication bus 926, which may be an ISA, EISA, VESA, PCI, or similar, for interconnecting all of the components of the computing device. A description of the general features and functionality of the display 910, keyboard and/or mouse 914, as well as the display controller 908, storage controller 924, network controller 906, sound controller 920, and general purpose I/O interface 912 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 10.

Figure 10:
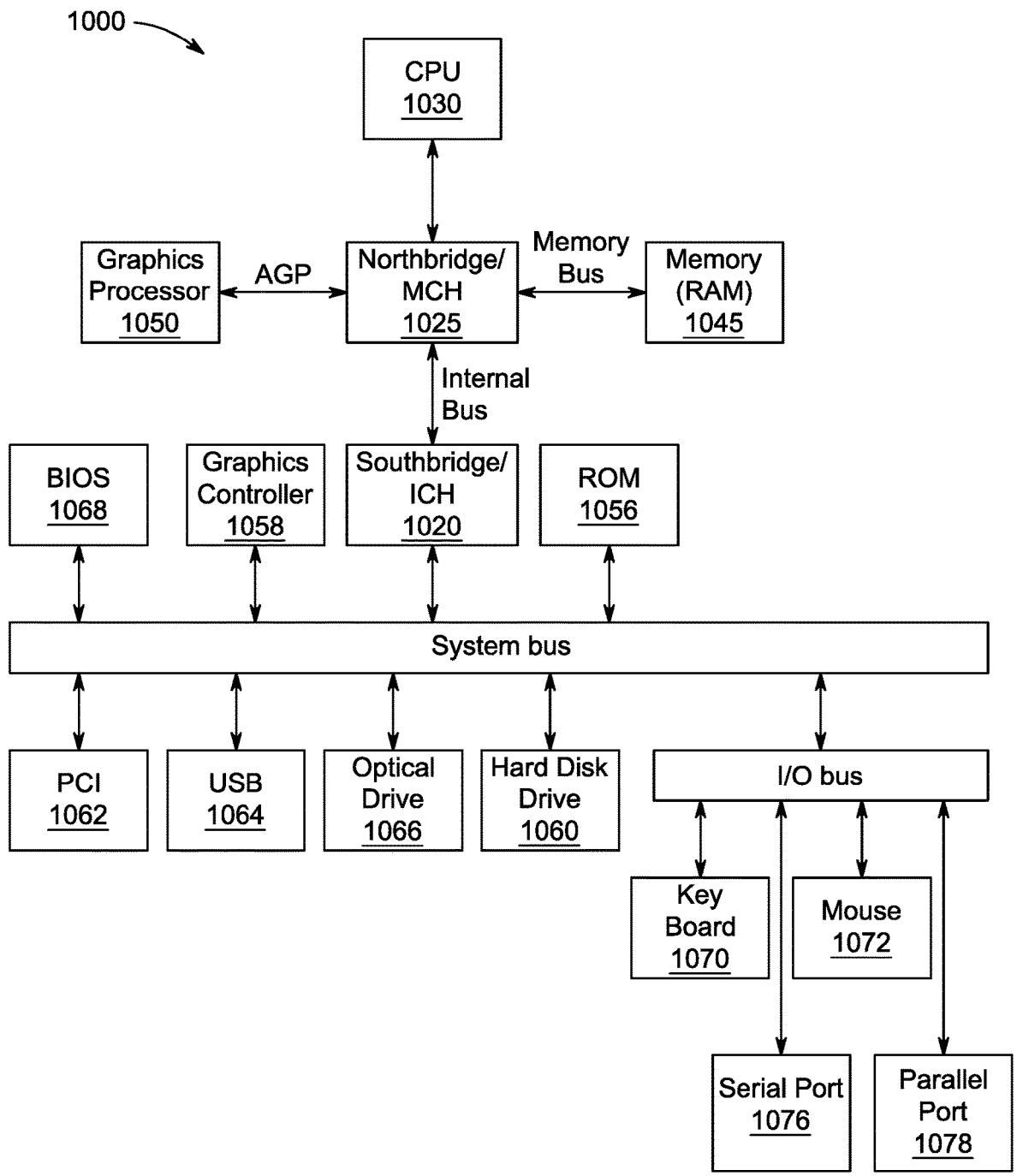
FIG. 10 is an exemplary schematic diagram of a data processing system used within the computing system, according to certain embodiments.

FIG. 10 shows a schematic diagram of a data processing system 1000 used within the computing system, according to exemplary aspects of the present disclosure. The data processing system 1000 is an example of a computer in which code or instructions implementing the processes of the illustrative aspects of the present disclosure may be located.

In FIG. 10, data processing system 1080 employs a hub architecture including a north bridge and memory controller hub (NB/MCH) 1025 and a south bridge and input/output (I/O) controller hub (SB/ICH) 1020. The central processing unit (CPU) 1030 is connected to NB/MCH 1025. The NB/MCH 1025 also connects to the memory 2045 via a memory bus, and connects to the graphics processor 1050 via an accelerated graphics port (AGP). The NB/MCH 1025 also connects to the SB/ICH 1020 via an internal bus (e.g., a unified media interface or a direct media interface). The CPU Processing unit 1030 may contain one or more processors and even may be implemented using one or more heterogeneous processor systems.

Figure 11:
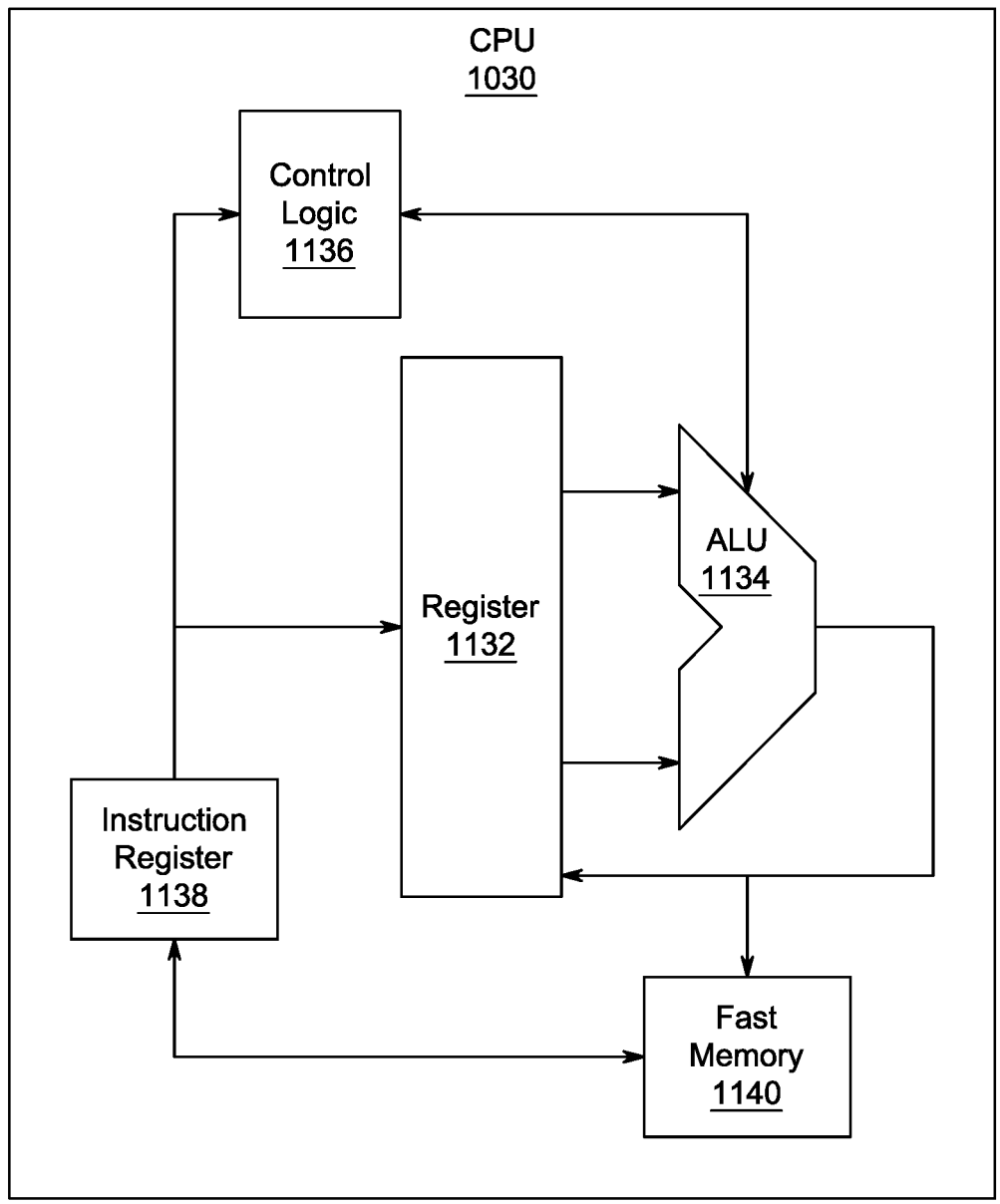
FIG. 11 is an exemplary schematic diagram of a processor used with the computing system, according to certain embodiments.

For example, FIG. 11 shows one aspects of the present disclosure of CPU 1030. In one aspects of the present disclosure, the instruction register 1138 retrieves instructions from the fast memory 1140. At least part of these instructions is fetched from the instruction register 1138 by the control logic 1136 and interpreted according to the instruction set architecture of the CPU 1030. Part of the instructions can also be directed to the register 1132. In one aspects of the present disclosure the instructions are decoded according to a hardwired method, and in another aspects of the present disclosure the instructions are decoded according to a microprogram that translates instructions into sets of CPU configuration signals that are applied sequentially over multiple clock pulses. After fetching and decoding the instructions, the instructions are executed using the arithmetic logic unit (ALU) 1134 that loads values from the register 1132 and performs logical and mathematical operations on the loaded values according to the instructions. The results from these operations can be feedback into the register and/or stored in the fast memory 1140. According to certain aspects of the present disclosures, the instruction set architecture of the CPU 1030 can use a reduced instruction set architecture, a complex instruction set architecture, a vector processor architecture, a very large instruction word architecture. Furthermore, the CPU 1030 can be based on the Von Neuman model or the Harvard model. The CPU 1030 can be a digital signal processor, an FPGA, an ASIC, a PLA, a PLD, or a CPLD. Further, the CPU 1030 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 10, the data processing system 1080 can include that the SB/ICH 1020 is coupled through a system bus to an I/O Bus, a read only memory (ROM) 1056, universal serial bus (USB) port 1064, a flash binary input/output system (BIOS) 1068, and a graphics controller 1058. PCI/PCIe devices can also be coupled to SB/ICH 1020 through a PCI bus 1062.

The PCI devices may include, for example, Ethernet adapters, add-in cards, and PC cards for notebook computers. The Hard disk drive 1060 and CD-ROM 1056 can use, for example, an integrated drive electronics (IDE) or serial advanced technology attachment (SATA) interface. In one aspects of the present disclosure the I/O bus can include a super I/O (SIO) device.

Further, the hard disk drive (HDD) 1060 and optical drive 1066 can also be coupled to the SB/ICH 1020 through a system bus. In one aspects of the present disclosure, a keyboard 1070, a mouse 1072, a parallel port 1078, and a serial port 1076 can be connected to the system bus through the I/O bus. Other peripherals and devices that can be connected to the SB/ICH 1020 using a mass storage controller such as SATA or PATA, an Ethernet port, an ISA bus, an LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 12:
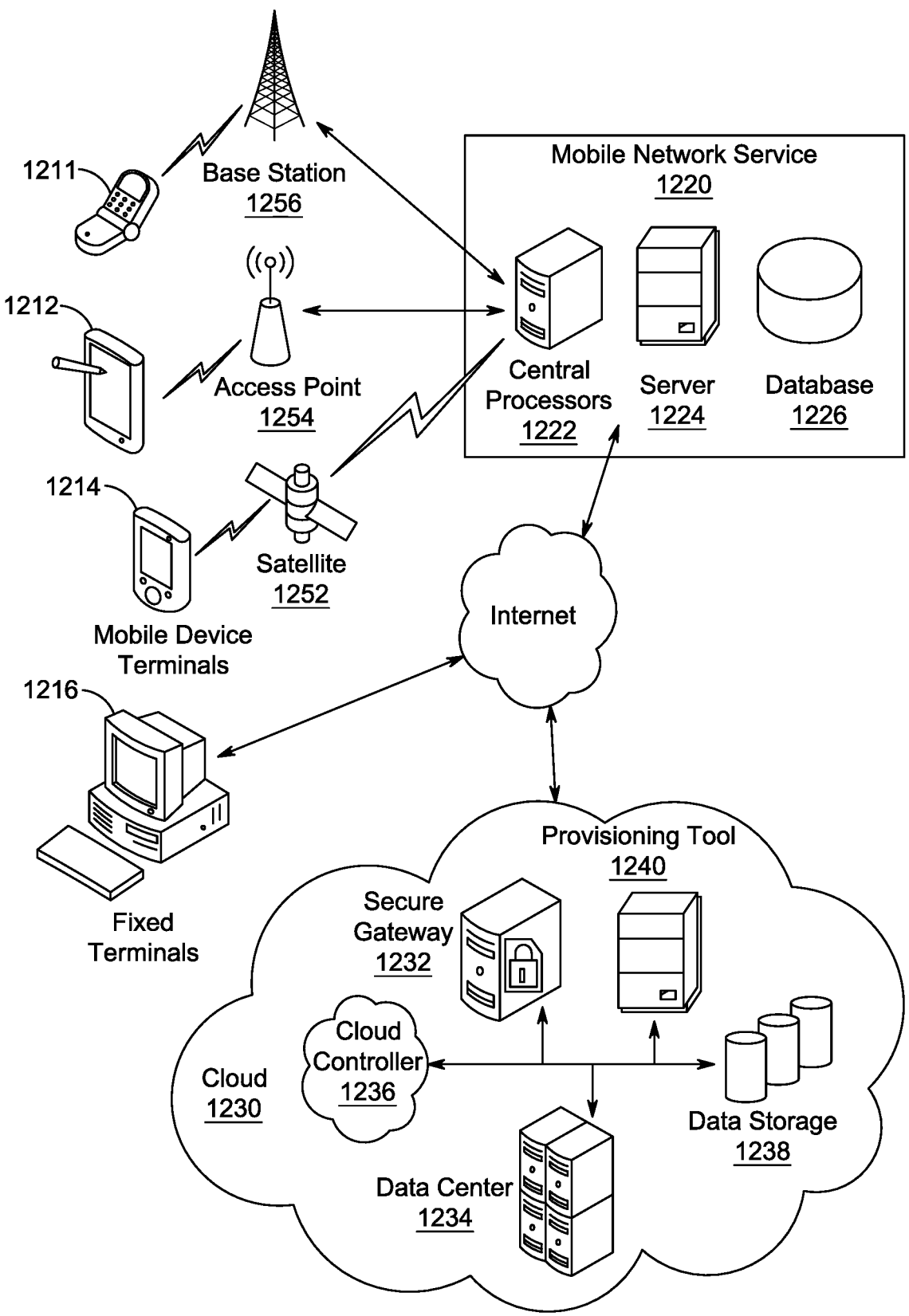
FIG. 12 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 12, in addition to various human interface and communication devices (e.g., display monitors, smart phones, tablets, personal digital assistants (PDAs)). More specifically, FIG. 12 illustrates client devices including a smart phone 1211, a tablet 1212, a mobile device terminal 1214 and fixed terminals 1216. These client devices may be commutatively coupled with a mobile network service 1220 via base station 1256, access point 1254, satellite 1252 or via an internet connection. Mobile network service 1220 may comprise central processors 1222, a server 1224 and a database 1226. Fixed terminals 1216 and mobile network service 1220 may be commutatively coupled via an internet connection to functions in cloud 1230 that may comprise security gateway 1232, data center 1234, cloud controller 1236, data storage 1238 and provisioning tool 1240. The network may be a private network, such as a LAN or WAN, or may be a public network, such as the Internet. Input to the system may be received via direct user input and received remotely either in real-time or as a batch process. Additionally, some aspects of the present disclosures may be performed on modules or hardware not identical to those described. Accordingly, other aspects of the present disclosures are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:
1. A method of passwordless authentication for a remote system by way of an authentication server, comprising:
  a registration stage including
    sending a request to the authentication server to use the passwordless authentication;

generating, by the authentication server, a lattice matrix, storing the lattice matrix in a database and returning a lattice generator matrix (LGM) to a user computing device;

computing, by the user computing device, a bioquantum of biometric data of a user based on the LGM using a post-quantum fuzzy commitment scheme (PQFC) and sending the bioquantum to the authentication server for storage in the database, wherein the method further comprises:

an authentication stage including:

requesting to login, by sending a request for login to the authentication server, in order to login to a remote system;

sharing, by the authentication server, a one-time secret key with the user via a secure URL;

encapsulating, by the user computing device, the secret key with a biometric query to generate a new bioquantum;

performing, by the authentication server, two indirect comparisons:

first compare the new bioquantum against the stored bioquantum, and second retrieve and compare hash values of the retrieved one-time secret key from the new bioquantum and the stored bioquantum; and returning results of the indirect comparisons to the user computing device in order to authenticate the user and login to the remote system.

2. The method of claim 1, wherein the LGM is generated by generating a squared m×m nonsingular matrix A and then choosing an n vectors (rows) randomly from A to obtain the Lattice Generator Matrix, M.

3. The method of claim 1, further comprising:

when a biometric template for the user is stolen, renewing a face biometric.

4. The method of claim 1, wherein in the authentication stage, the hash value h(K) of the one-time secret key is stored in the database.

5. The method of claim 1, wherein the bioquantum of the user's biometric data is computed based on a face template and the LGM.

6. The method of claim 1, further comprising:

calculating a post quantum fuzzy commitment, F, given by $F(v,x)=(v \times_q M)+x$ where M is the LGM, v is a secret vector chosen randomly, x is a natural error distribution and $X_q$ is modulo matrix multiplication.

7. A system for passwordless authentication for accessing a remote system, comprising:

an authentication server;

a database;

a user computing device configured to send a request to the authentication server to use the passwordless authentication;

the authentication server configured to generate, a lattice matrix, store the lattice matrix in the database and return a lattice generator matrix (LGM) to the user computing device;

the user computing device configured to compute a bioquantum of biometric data of a user based on the LGM using a post-quantum fuzzy commitment scheme (PQFC) and send the bioquantum to the authentication server for storage in the database, wherein the user computing device is further configured to send a request for login to the authentication server;

the authentication server is further configured to share a one-time secret key with the user via a secure URL;

the user computing device is further configured to encapsulate the secret key with a biometric query to generate a new bioquantum; and the authentication server is further configured to perform two indirect comparisons:

first compare the new bioquantum against the stored bioquantum, and second retrieve and compare hash values of the retrieved one-time secret key from the new bioquantum and the stored bioquantum; and return results of the indirect comparisons to the user computing device in order to authenticate the user and login to the remote system.

8. The system of claim 7, wherein the authentication server is further configured to generate the LGM by generating a squared m×m nonsingular matrix A and then choosing an n vectors (rows) randomly from A to obtain the Lattice Generator Matrix, M.

9. The system of claim 7, wherein the user computing device is further configured to when a biometric template for a user is stolen, renew a face biometric.

10. The system of claim 7, wherein the authentication server is further configured to store, the hash value h(K) of the one-time secret key in the database.

11. The system of claim 7, wherein the authentication server is further configured to compute the bioquantum based on a face template and the LGM.

12. The system of claim 7, wherein the user computing device is further configured to calculate a post quantum fuzzy commitment, F, given by $F(v,x)=(v \times_q M)+x$ where M is the LGM, v is a secret vector chosen randomly, x is a natural error distribution and $X_q$ is modulo matrix multiplication.

13. A non-transitory computer readable storage medium storing program code which when executed by processing circuitry performs a method of passwordless authentication for a remote system by way of an authentication server, the method comprising:

a registration stage including sending a request to the authentication server to use the passwordless authentication;

generating, by the authentication server, a lattice matrix, storing the lattice matrix in a database and returning a lattice generator matrix (LGM) to a user computing device;

computing, by the user computing device, a bioquantum of biometric data of the user based on the LGM using a post-quantum fuzzy commitment scheme (PQFC) and sending the bioquantum to the authentication server for storage in the database, wherein the method further comprises:

an authentication stage of requesting to login, by sending a request for login to the authentication server;

sharing, by the authentication server, a one-time secret key with the user via a secure URL;

encapsulating, by the user computing device, the secret key with a biometric query to generate a new bioquantum;

performing, by the authentication server, two indirect comparisons:

first compare the new bioquantum against the stored bioquantum, and second retrieve and compare hash values of the retrieved one-time secret key from keyed-bioquantum and the stored bioquantum; and returning results of the indirect comparisons to the user computing device in order to authenticate the user and login to the remote system.

14. The non-transitory computer readable storage medium of claim 13, wherein the LGM is generated by generating a squared m×m nonsingular matrix A and then choosing an n vectors (rows) randomly from A to obtain the Lattice Generator Matrix, M.

15. The non-transitory computer readable storage medium of claim 13, further comprising:

when a biometric template for a user is stolen, renewing a face biometric.

16. The non-transitory computer readable storage medium of claim 13, wherein in the authentication stage, the hash value h(K) of the one-time secret key is stored in the database.

17. The non-transitory computer readable storage medium of claim 13, wherein the bioquantum of the user's biometric data is computed based on a face template and the LGM.

* * * * *